US011374638B2

(12) United States Patent
Fakoorian et al.

(10) Patent No.: US 11,374,638 B2
(45) Date of Patent: Jun. 28, 2022

(54) CHANNEL QUALITY INDICATOR REPORT BASED ON DEMODULATION REFERENCE SIGNAL

(71) Applicant: QUALCOMM Incorporated, San Diego, CA (US)

(72) Inventors: Seyed Ali Akbar Fakoorian, San Diego, CA (US); Jing Sun, San Diego, CA (US); Xiaoxia Zhang, San Diego, CA (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 16/592,184

(22) Filed: Oct. 3, 2019

(65) Prior Publication Data

US 2020/0112357 A1 Apr. 9, 2020

Related U.S. Application Data

(60) Provisional application No. 62/742,094, filed on Oct. 5, 2018, provisional application No. 62/755,040, filed on Nov. 2, 2018.

(51) Int. Cl.
*H04L 1/18* (2006.01)
*H04B 7/06* (2006.01)
(Continued)

(52) U.S. Cl.
CPC ......... *H04B 7/0632* (2013.01); *H04B 17/336* (2015.01); *H04L 1/1812* (2013.01);
(Continued)

(58) Field of Classification Search
CPC .... H04B 17/336; H04B 7/024; H04B 7/0626; H04B 7/0632; H04L 1/0026; H04L 1/1812; H04L 5/0057; H04W 72/0413
See application file for complete search history.

(56) References Cited

U.S. PATENT DOCUMENTS

2015/0263796 A1 9/2015 Nam et al.
2015/0304093 A1* 10/2015 Loehr .................. H04L 5/0048
370/329

(Continued)

FOREIGN PATENT DOCUMENTS

EP 2874335 A1 5/2015
WO WO-2012020312 A2 2/2012

OTHER PUBLICATIONS

International Search Report and Written Opinion—PCT/US2019/054687—ISA/EPO—dated Jan. 17, 2020.

*Primary Examiner* — Mansour Oveissi
(74) *Attorney, Agent, or Firm* — Holland & Hart LLP/Qualcomm Incorporated

(57) ABSTRACT

Methods, systems, and devices channel quality indicator (CQI) reporting based on demodulation reference signal (DMRS) from a base station are described. In some cases, a base station may configure a user equipment (UE) with such DMRS based CQI reporting (e.g., by transmitting a CQI reporting configuration to the UE). The CQI reporting configuration may specify the UE is to report CQI based on DMRS and, in some cases, may configure the UE to report the CQI with hybrid automatic repeat request (HARQ) feedback. A UE may receive a control message that indicates a resource for reception of a downlink transmission and an uplink control resource for transmission of CQI information. The UE may identify a DMRS of the downlink transmission, calculate a CQI based on the DMRS, and transmit the calculated CQI to the base station via the uplink control resource indicated by the received control message.

30 Claims, 18 Drawing Sheets

(51) Int. Cl.
*H04L 5/00* (2006.01)
*H04B 17/336* (2015.01)
*H04W 72/04* (2009.01)

(52) U.S. Cl.
CPC .......... *H04L 5/0051* (2013.01); *H04L 5/0057* (2013.01); *H04W 72/0413* (2013.01)

(56) References Cited

U.S. PATENT DOCUMENTS

2019/0141555 A1* 5/2019 Tooher ................. H04B 17/309
2020/0068605 A1* 2/2020 Golitschek Edler von Elbwart ... H04W 72/1268

* cited by examiner

CHANNEL QUALITY INDICATOR REPORT BASED ON DEMODULATION REFERENCE SIGNAL

CROSS REFERENCE

The present Application for Patent claims the benefit of U.S. Provisional Patent Application No. 62/742,094 by FAKOORIAN et al., entitled "CHANNEL QUALITY INDICATOR REPORT BASED ON DEMODULATION REFERENCE SIGNAL," filed Oct. 5, 2018 and U.S. Provisional Patent Application No. 62/755,040 by FAKOORIAN et al., entitled "CHANNEL QUALITY INDICATOR REPORT BASED ON DEMODULATION REFERENCE SIGNAL," filed Nov. 2, 2018, assigned to the assignee hereof, and expressly incorporated herein.

BACKGROUND

The following relates generally to wireless communications, and more specifically to channel quality indicator (CQI) report based on demodulation reference signal (DMRS).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some wireless communications systems may support ultra-reliable low latency communication (URLLC) between a base station and a UE. However, the low latency requirements of a URLLC system may be incompatible with conventional transmission methods. In particular, conventional techniques for performing channel state information (CSI) reporting for URLLC may be deficient considering the low latency requirements of a URLLC system.

SUMMARY

The described techniques relate to improved methods, systems, devices, or apparatuses that support channel quality indicator (CQI) report based on demodulation reference signal (DMRS). Specifically, the techniques described herein provide procedures at a user equipment (UE) for performing CQI reporting based on a DMRS received from a base station. In some cases, the base station may configure the UE with such DMRS based CQI reporting (e.g., by transmitting a CQI reporting configuration to the UE). The CQI reporting configuration may specify the UE is to report CQI based on DMRS and, in some cases, may configure the UE to report the CQI with hybrid automatic repeat request (HARQ) feedback (e.g., with acknowledgement (ACK)/negative acknowledgement (NACK) reporting from the UE).

For example, a UE may receive a control message (e.g., a physical downlink control channel (PDCCH) transmission) that indicates a resource for reception of a downlink transmission (e.g., a physical downlink shared channel (PDSCH) transmission) and an uplink control resource (e.g., a physical uplink control channel (PUCCH) resource) for transmission of CQI information (e.g., a CQI report, signal to noise ratio (SNR) information, a channel state information (CSI) report, etc.). The UE may identify a DMRS of the downlink transmission, and calculate a CQI based on the DMRS. The UE may then transmit the calculated CQI to the base station via the uplink control resource indicated by the control message received from the base station. In some cases, the CQI information may be transmitted with HARQ feedback using the uplink control resource (e.g., the UE may multiplex the CQI with an ACK/NACK corresponding to the downlink transmission). In other cases, the control message may indicate separate uplink resources for each of the CQI and the HARQ feedback.

In some cases, the reported CQI may include SNR information associated with the DMRS received by the UE. In some cases, the CQI report may include the absolute SNR (e.g., the explicit value of the measured SNR). In other cases, the CQI report may include delta SNR (e.g., a delta SNR value relative to some reference SNR value). For example, CQI reporting of delta SNR may reduce the range of reportable SNR, resulting in less CQI reporting overhead. In some cases, the reference SNR may refer to some radio resource control (RRC) configured SNR for the configured modulation coding scheme (MCS), the SNR of a previous DMRS, the SNR from the previous CQI requested by the base station, etc.

In some cases, multiple downlink transmissions (e.g., multiple PDSCH transmissions) may indicate the same uplink control resource (e.g., the same PUCCH) for CQI reporting based on the DMRS. In such cases where PUCCH for DMRS based CQI observes multiple PDSCHs, the UE may report CQI for a reference PDSCH. In some cases, the reference PDSCH may be configured via RRC signaling, the latest (e.g., most recently received) DMRS, etc. In some cases, downlink control information (DCI) of the PDCCH may indicate which PDSCH are to be associated with CQI reporting (e.g., by adding a bit in DCI for each PDSCH configured by the control message from the base station). The UE may then report CQI for the indicated PDSCH. In other cases where PUCCH for DMRS based CQI observes multiple PDSCHs, the UE may calculate CQI for all, or a subset, of the PDSCHs (e.g., based on the DMRS associated with each PDSCH). In such cases, the UE may report each CQI, an average CQI, a maximum CQI variation, etc., for all PDSCHs within the PUCCH window.

The base station may receive CQI from the UE, and may determine resources and configurations for communications with the UE (e.g., the base station may identify a MCS for a next transmission, or in some cases a retransmission, to the UE). In some cases, the base station may reduce MCS configuration overhead (e.g., MCS bit fields in downlink DCI) once DMRS based CQI is triggered. For example, the base station may indicate a delta MCS (e.g., a delta value from the previous MCS value to the updated MCS value) in DCI, which may reduce the number of bits needed to convey an MCS update to the UE. A method of wireless communication at a UE is described.

The method may include receiving a control message that indicates a resource for reception of a downlink transmission and a first uplink control resource for transmission of a CQI, identifying a DMRS of the downlink transmission based on the control message, calculating the CQI based on the identified DMRS, and transmitting the calculated CQI via the first uplink control resource.

An apparatus for wireless communication at a UE is described. The apparatus may include a processor, memory coupled with the processor, and instructions stored in the memory. The instructions may be executable by the processor to cause the apparatus to receive a control message that indicates a resource for reception of a downlink transmission and a first uplink control resource for transmission of a CQI, identify a DMRS of the downlink transmission based on the control message, calculate the CQI based on the identified DMRS, and transmit the CQI indicator via the first uplink control resource.

Another apparatus for wireless communication at a UE is described. The apparatus may include means for receiving a control message that indicates a resource for reception of a downlink transmission and a first uplink control resource for transmission of a CQI, identifying a DMRS of the downlink transmission based on the control message, calculating the CQI based on the identified DMRS, and transmitting the calculated CQI via the first uplink control resource.

A non-transitory computer-readable medium storing code for wireless communication at a UE is described. The code may include instructions executable by a processor to receive a control message that indicates a resource for reception of a downlink transmission and a first uplink control resource for transmission of a CQI, identify a DMRS of the downlink transmission based on the control message, calculate the CQI based on the identified DMRS, and transmit the calculated CQI via the first uplink control resource.

Some examples of the method, apparatuses, and non-transitory computer-readable medium described herein may further include operations, features, means, or instructions for multiplexing, on the first uplink control resource, the calculated CQI with an ACK or a NACK associated with the downlink transmission.

Some examples of the method, apparatuses, and non-transitory computer-readable medium described herein may further include operations, features, means, or instructions for receiving, with the control message, an indication of a second uplink control resource for transmission of HARQ feedback, where the first uplink control resource and the second uplink control resource may be different and transmitting an ACK or a NACK associated with the downlink transmission via the second uplink control resource. Some examples of the method, apparatuses, and non-transitory computer-readable medium described herein may further include operations, features, means, or instructions for receiving a timing offset and identifying the first uplink control resource based on the timing offset and the second uplink control resource.

In some examples of the method, apparatuses, and non-transitory computer-readable medium described herein the transmitted CQI indicates an ACK (e.g., an early ACK) of the downlink transmission. In some examples of the method, apparatuses, and non-transitory computer-readable medium described herein the transmitted CQI indicates a NACK (e.g., an early NACK) of the downlink transmission. Some examples of the method, apparatuses, and non-transitory computer-readable medium described herein may further include operations, features, means, or instructions for receiving a retransmission of the downlink transmission based at least in part on the transmitted CQI.

In some examples of the method, apparatuses, and non-transitory computer-readable medium described herein, transmitting the calculated CQI further may include operations, features, means, or instructions for measuring a SNR of the identified DMRS and transmitting a delta SNR, where the delta SNR may be based on the measured SNR of the identified DMRS and a reference SNR. In some examples of the method, apparatuses, and non-transitory computer-readable medium described herein, the reference SNR includes an SNR of a configured MCS, an SNR of a previous DMRS, or an SNR of a previous requested CQI.

In some examples of the method, apparatuses, and non-transitory computer-readable medium described herein, transmitting the calculated CQI further may include operations, features, means, or instructions for measuring a SNR of the identified DMRS and transmitting an absolute SNR, where the absolute SNR may be based on the measured SNR of the identified DMRS. In some examples of the method, apparatuses, and non-transitory computer-readable medium described herein, identifying the DMRS of the downlink transmission further may include operations, features, means, or instructions for identifying a reference PDSCH associated with the downlink transmission, where the DMRS may be identified based on the reference PDSCH.

In some examples of the method, apparatuses, and non-transitory computer-readable medium described herein, identifying the DMRS of the downlink transmission further may include operations, features, means, or instructions for identifying a most recent DMRS. Some examples of the method, apparatuses, and non-transitory computer-readable medium described herein may further include operations, features, means, or instructions for identifying a reference PDSCH associated with the downlink transmission based on the received control message, where the DMRS may be identified based on the reference PDSCH.

Some examples of the method, apparatuses, and non-transitory computer-readable medium described herein may further include operations, features, means, or instructions for identifying a set of PDSCHs associated with the downlink transmission, selecting a PDSCH of the set of PDSCHs, calculating the CQI based on a DMRS associated with the selected PDSCH and transmitting an indication of the selected PDSCH and the calculated CQI based on the first uplink control resource.

Some examples of the method, apparatuses, and non-transitory computer-readable medium described herein may further include operations, features, means, or instructions for identifying a set of PDSCHs associated with the downlink transmission, calculating a set of CQI, each CQI based on a DMRS associated with each PDSCH of the set of PDSCHs, identifying an average CQI based on the set of calculated CQI and transmitting the average CQI based on the first uplink control resource. In some examples of the method, apparatuses, and non-transitory computer-readable medium described herein, the set of PDSCHs may be within a window of the first uplink control resource.

Some examples of the method, apparatuses, and non-transitory computer-readable medium described herein may further include operations, features, means, or instructions for identifying a set of PDSCHs associated with the downlink transmission, calculating a set of CQI, each CQI based on a DMRS associated with each PDSCH of the set of PDSCHs, identifying a maximum CQI variation based on the set of calculated CQI and transmitting the maximum CQI variation based on the first uplink control resource.

Some examples of the method, apparatuses, and non-transitory computer-readable medium described herein may further include operations, features, means, or instructions for identifying a set of PDSCHs associated with the downlink transmission, calculating a set of CQI, each CQI based on a DMRS associated with each PDSCH of the set of PDSCHs and transmitting each of the calculated set of CQIs with a corresponding ACK or a NACK associated with each PDSCH, based on the first uplink control resource.

Some examples of the method, apparatuses, and non-transitory computer-readable medium described herein may further include operations, features, means, or instructions for determining a NACK to be sent based on the downlink transmission and transmitting the calculated CQI based on the determination. In some examples of the method, apparatuses, and non-transitory computer-readable medium described herein, the calculated CQI includes the determined NACK.

Some examples of the method, apparatuses, and non-transitory computer-readable medium described herein may further include operations, features, means, or instructions for receiving a CQI reporting configuration for calculating the CQI based on DMRS measurement and transmitting the CQI with HARQ feedback, where the CQI may be calculated based on the CQI reporting configuration.

In some examples of the method, apparatuses, and non-transitory computer-readable medium described herein, transmitting the calculated CQI further may include operations, features, means, or instructions for transmitting the calculated CQI with HARQ feedback based on the CQI reporting configuration. In some examples of the method, apparatuses, and non-transitory computer-readable medium described herein, the CQI reporting configuration may be received via RRC signaling.

In some examples of the method, apparatuses, and non-transitory computer-readable medium described herein, identifying the DMRS further may include operations, features, means, or instructions for identifying a CQI report indication based on the control message, where the CQI report indication may be associated with a PDSCH transmission and identifying the DMRS based on the PDSCH transmission. In some examples of the method, apparatuses, and non-transitory computer-readable medium described herein, the transmitted CQI corresponds to the PDSCH transmission. In some examples of the method, apparatuses, and non-transitory computer-readable medium described herein, the CQI report indication includes a DCI bit in the received control message.

A method of wireless communication at a base station is described. The method may include transmitting a control message that indicates a resource for a downlink transmission and a first uplink control resource for reception of a CQI, transmitting the downlink transmission, where the downlink transmission includes a DMRS, and receiving the CQI via the first uplink control resource, where the CQI is based on the DMRS.

An apparatus for wireless communication at a base station is described. The apparatus may include a processor, memory coupled with the processor, and instructions stored in the memory. The instructions may be executable by the processor to cause the apparatus to transmit a control message that indicates a resource for a downlink transmission and a first uplink control resource for reception of a CQI, transmit the downlink transmission, where the downlink transmission includes a DMRS, and receive the CQI via the first uplink control resource, where the CQI is based on the DMRS.

Another apparatus for wireless communication at a base station is described. The apparatus may include means for transmitting a control message that indicates a resource for a downlink transmission and a first uplink control resource for reception of a CQI, transmitting the downlink transmission, where the downlink transmission includes a DMRS, and receiving the CQI via the first uplink control resource, where the CQI is based on the DMRS.

A non-transitory computer-readable medium storing code for wireless communication at a base station is described. The code may include instructions executable by a processor to transmit a control message that indicates a resource for a downlink transmission and a first uplink control resource for reception of a CQI, transmit the downlink transmission, where the downlink transmission includes a DMRS, and receive the CQI via the first uplink control resource, where the CQI is based on the DMRS.

Some examples of the method, apparatuses, and non-transitory computer-readable medium described herein may further include operations, features, means, or instructions for transmitting a CQI reporting configuration for CQI calculation based on DMRS measurement and CQI reporting with HARQ feedback, where the CQI may be received based on the CQI reporting configuration. In some examples of the method, apparatuses, and non-transitory computer-readable medium described herein, the CQI reporting configuration may be transmitted via RRC signaling.

Some examples of the method, apparatuses, and non-transitory computer-readable medium described herein may further include operations, features, means, or instructions for transmitting a CQI report indication, where the CQI report indication may be associated with a PDSCH transmission and receiving the CQI based on the CQI report indication, where the CQI corresponds to the PDSCH transmission.

In some examples of the method, apparatuses, and non-transitory computer-readable medium described herein, the CQI report indication includes a DCI bit in the transmitted control message. Some examples of the method, apparatuses, and non-transitory computer-readable medium described herein may further include operations, features, means, or instructions for receiving an ACK or a NACK associated with the downlink transmission via the first uplink control resource. In some examples of the method, apparatuses, and non-transitory computer-readable medium described herein, the ACK or the NACK associated with the downlink transmission may be multiplexed with the calculated CQI.

Some examples of the method, apparatuses, and non-transitory computer-readable medium described herein may further include operations, features, means, or instructions for transmitting, with the control message, an indication of a second uplink control resource for transmission of HARQ feedback and receiving an ACK or a NACK associated with the downlink transmission via the second uplink control resource.

Some examples of the method, apparatuses, and non-transitory computer-readable medium described herein may further include operations, features, means, or instructions for identifying a timing offset between the first uplink control resource and the second uplink control resource and transmitting the timing offset, where the ACK or the NACK associated with the downlink transmission may be received via the second uplink control resource indicated by the timing offset.

In some examples of the method, apparatuses, and non-transitory computer-readable medium described herein the received CQI indicates an ACK (e.g., an early ACK) of the downlink transmission. In some examples of the method, apparatuses, and non-transitory computer-readable medium described herein the received CQI indicates a NACK (e.g., an early NACK) of the downlink transmission. Some examples of the method, apparatuses, and non-transitory computer-readable medium described herein may further include operations, features, means, or instructions for transmitting a retransmission of the downlink transmission based at least in part on the received CQI.

In some examples of the method, apparatuses, and non-transitory computer-readable medium described herein, receiving the CQI may include operations, features, means, or instructions for receiving an absolute SNR associated with the DMRS or a delta SNR associated with the DMRS and a reference SNR. In some examples of the method, apparatuses, and non-transitory computer-readable medium described herein, the reference SNR includes an SNR of a configured MCS, an SNR of a previous DMRS, or an SNR of a previous requested CQI. Some examples of the method, apparatuses, and non-transitory computer-readable medium described herein may further include operations, features, means, or instructions for identifying a MCS offset based on the received CQI and transmitting an indication of the MCS offset.

Some examples of the method, apparatuses, and non-transitory computer-readable medium described herein may further include operations, features, means, or instructions for identifying an outer loop link adaptation based on CQIs received based on SRSs or CSI-RSs and identifying an internal loop link adaptation based on CQIs received based on DMRS. Some examples of the method, apparatuses, and non-transitory computer-readable medium described herein may further include operations, features, means, or instructions for identifying a MCS update based on the identified internal loop link adaptation and transmitting an indication of the MCS update. Some examples of the method, apparatuses, and non-transitory computer-readable medium described herein may further include operations, features, means, or instructions for identifying a bursty interference condition based on the identified inter loop link adaptation.

DETAILED DESCRIPTION

Figure 1:
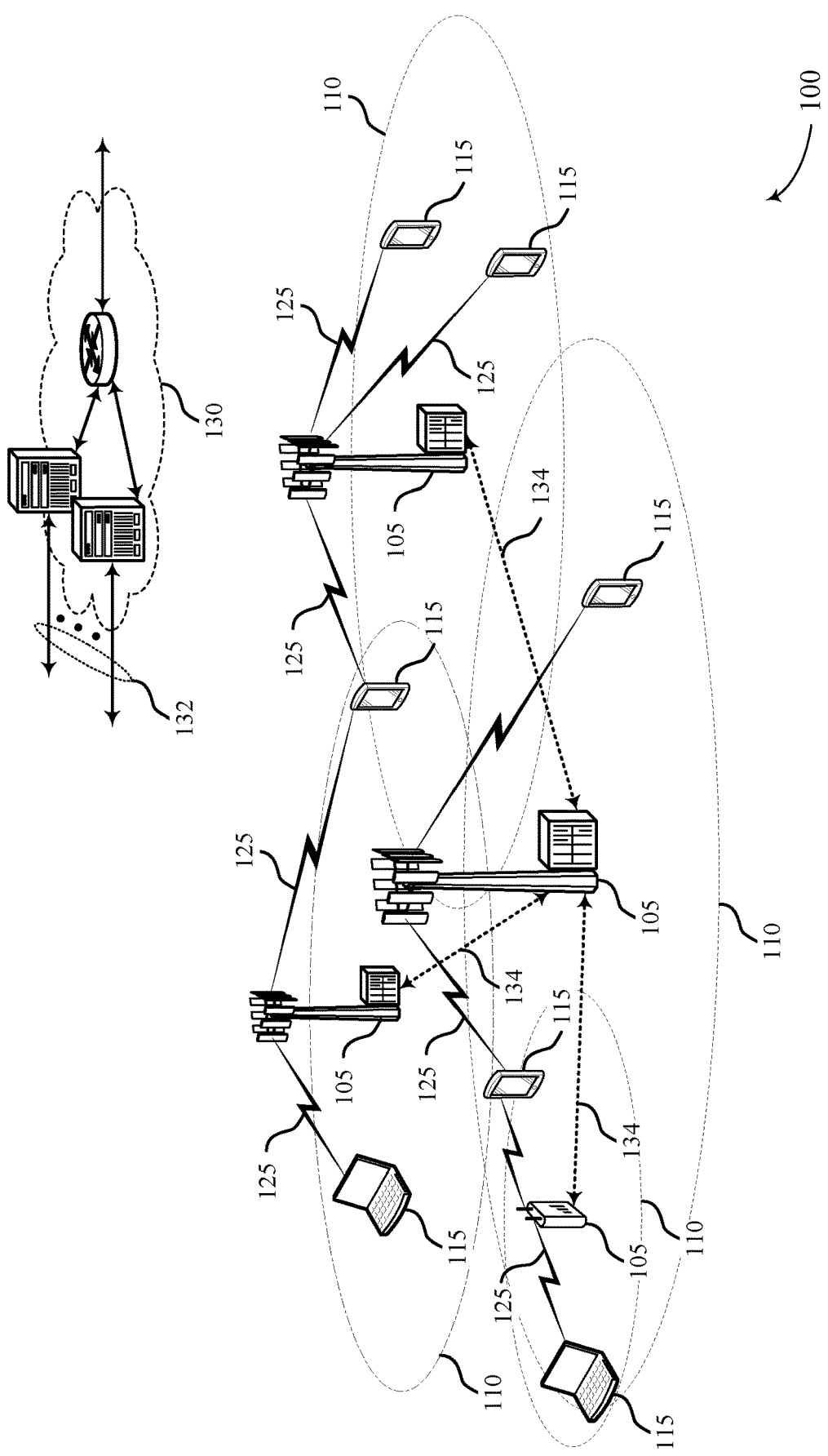
FIG. 1 illustrates an example of a system for wireless communications that supports channel quality indicator (CQI) report based on demodulation reference signal (DMRS) in accordance with aspects of the present disclosure.

In some wireless communications systems, a user equipment (UE) may be configured to transmit channel state information (CSI) reports to a base station. CSI reports may include information for a base station to use to determine appropriate configurations for communicating with a UE. For example, a CSI report from a UE may include a channel quality indicator (CQI) which a base station may use to identify a modulation and coding scheme (MCS) for a transmission to the UE. In some cases, a base station may transmit CSI reference signals (CSI-RSs), and a UE may perform measurements on the received CSI-RSs to determine the information (e.g., CQI, signal to noise ratio (SNR) information, etc.) to include in CSI report. As such, a base station may use the CSI reports received from a UE to determine appropriate configurations and appropriate resources for communicating with the UE.

However, in some cases, different applications or services (e.g., such as ultra-reliable low latency communication (URLLC)) may be associated with more stringent block error rate (BLER) targets or reliability targets (e.g., $10^{-5}$ or $10^{-9}$). In such cases, it may be desirable to increase the frequency of CSI reporting to meet the lower latency requirements and increased reliability requirements of the system. For example, aperiodic CSI (A-CSI) reporting based on CSI-RS received by a UE may be too slow for latency stringent and high reliability applications such as URLLC. In some cases (e.g., in URLLC use cases for factory automation), packets may be periodic. A-CSI reporting time may be larger than hybrid automatic repeat request (HARQ) reporting (e.g., acknowledgement (ACK)/negative acknowledgement (NACK) reporting). In such cases, a base station may wait extended time periods (e.g., after retransmission of a failed packet) to get an A-CSI report, and retransmissions may thus be associated with outdated CSI information (e.g., as CSI information may have changed over the course of the retransmissions from the base station).

As described herein, a wireless communications system may support efficient techniques for performing CSI reporting based on demodulation reference signals (DMRSs). For CSI reporting, a UE may be configured to generate a CSI report (e.g., measure CQI) based on DMRS. In some cases, DMRS based CQI reporting may be faster than A-CSI reporting based on CSI-RSs, sounding reference signals (SRSs), etc. For example, physical downlink shared channel (PDSCH) transmissions may include DMRS to facilitate decoding of the PDSCH. As each PDSCH may be associated with DMRS, DMRS based CQI reporting may provide for faster CQI reporting. For example, in retransmission scenarios, a CQI report (e.g., determined by a UE based on DMRS included in the original PDSCH transmission) may be included with a NACK sent by a UE. As such, the base station may utilize the CQI information for determining appropriate configurations and appropriate resources for communicating the retransmission to the UE.

In some cases, a UE may receive a CQI reporting configuration from a base station. The CQI reporting configuration may indicate that CQI is to be determined based on DMRS (e.g., the CQI reporting configuration may trigger DMRS based CQI reporting). In some cases, the CQI reporting configuration may further configure the UE to transmit CQI reports with HARQ feedback. As such, when a base station transmits a control message (e.g., physical uplink control channel (PUCCH)) to the UE, the UE may identify DMRS for CQI calculation and CQI reporting based on the PDSCH indicated by the control message. That is, the UE may receive a control message from a base station configuring PDSCH and PUCCH resources for the UE. The UE may identify DMRS associated with the PDSCH, calculate CQI information based on the DMRS (e.g., based on SNR of the DMRS), and report the CQI information via the PUCCH resource indicated by the control message.

The base station may receive CQI from the UE, and may determine resources and configurations for communications with the UE (e.g., the base station may identify a MCS for a next transmission, or in some cases a retransmission, to the UE). In some cases, the base station may reduce MCS configuration overhead (e.g., MCS bit fields in downlink DCI) once DMRS based CQI is triggered. For example, because CQI reporting based on DMRS may be accurate and up to date (e.g., faster compared to other reference signal based CQI), the base station may adhere or follow the suggested offset SNR/MCS from the UE for next transmissions to the UE. The base station may indicate a delta MCS (e.g., a delta value from the previous MCS value to the updated MCS value) in DCI, which may reduce the number of bits needed to convey an MCS update to the UE.

Beneficially, the described techniques may facilitate base station and UE satisfaction of reliability and latency targets for a particular application or service (e.g., such as URLLC). A UE calculating CQI based on DMRS of a downlink transmission (e.g., based on DMRS of PDSCH configured by a control message from a base station) may provide for a base station being able to more reliably identify resources and configurations for communications with the UE. Base station configuration of UE CQI reporting with HARQ feedback may thus provide for more reliable communications from a base station (e.g., as CQI may be reported faster or more frequently), resulting in increased throughput and reduced latency in a wireless communications system (e.g., due to less retransmissions, more successful retransmissions, etc.). Further, as discussed above, DMRS based CQI may provide opportunity for reducing MCS signaling overhead from a base station. Such may be beneficial in reducing DCI overhead (e.g., for supporting compact DCI in systems such as URLLC systems).

Aspects of the disclosure introduced above are described below in the context of a wireless communications system. Examples of processes and signaling exchanges that support CQI reporting based on DMRS are then described. Aspects of the disclosure are further illustrated by and described with reference to apparatus diagrams, system diagrams, and flowcharts that relate to CQI reporting based on DMRS.

FIG. 1 illustrates an example of a wireless communications system 100 that supports CQI report based on DMRS in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, URLLC, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces). As described herein, a base station 105 may transmit control information to a UE 115 in downlink control information (DCI), MAC control elements (MAC-CEs), or RRC messages. In some cases, the dynamic signaling of parameters described herein using DCI may significantly increase DCI size and may degrade the performance of DCI. Further, the use of RRC messages for signaling the parameters described herein may result in high latency. Thus, at least some of the parameters described herein may be signaled using MAC-CEs.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams.

Different spatial layers may be associated with different antenna ports used for channel measurement and reporting.

An antenna port is a logical entity used to map data streams to antennas. A given antenna port may drive transmissions from one or more antennas (e.g., and resolve signal components received over one or more antennas). Each antenna port may be associated with a reference signal (e.g., which may allow the receiver to distinguish data streams associated with the different antenna ports in a received transmission). In some cases, some antenna ports may be referred to as quasi co-located, meaning that the spatial parameters associated with a transmission on one antenna port may be inferred from the spatial parameters associated with another transmission on a different antenna port. That is, the antenna ports may have a quasi co-location (QCL) relationship with each other. Transmissions from a group of quasi co-located antenna ports may be referred to as transmissions from a QCL group.

A UE 115 in wireless communications system 100 may be configured to transmit CQI reports to a base station 105. CQI reports may include information for a base station 105 to use to determine appropriate configurations for communicating with a UE 115. For instance, a CQI report from a UE 115 may include a CQI which a base station 105 may use to identify an MCS for a transmission to a UE 115. In some cases, the base station 105 may use CQI to estimate the quality of channels available for communications with the UE 115 such that the base station may be able to identify appropriate resources for communicating with the UE 115. Thus, a base station 105 may use CQI reports received from a UE 115 to determine appropriate configurations and appropriate resources for communications with the UE 115.

As mentioned above, wireless communications system 100 may support URLLC between base stations 105 and UEs 115. In some cases, different URLLC applications or services may be associated with different BLER targets or reliability targets (e.g., $10^{-5}$ or $10^{-9}$). For example, in some dense urban environments or factory automation settings a relatively large number of devices (e.g., base stations 105 and UEs 115) may be present in a small area. Further, some applications such as industrial internet of things (IIoT), factory automation, etc. may demand highly granular or tight coordination in control (e.g., such as in positioning). In such cases, if CQI information is not frequently communicated to a base station 105, and a base station 105 determines a configuration for communicating with a UE 115 using outdated information included in the CQI report, the base station 105 may not be able to satisfy the BLER target for a particular application or service, there may be reduced throughput in a wireless communications system, etc.

As such, wireless communications system 100 may support efficient techniques described herein for CSI reporting based on DMRS. In some cases, the base station 105 may configure the UE 115 with such DMRS based CQI reporting (e.g., by transmitting a CQI reporting configuration to the UE 115). The CQI reporting configuration may specify the UE 115 is to report CQI based on DMRS and, in some cases, may configure the UE 115 to report the CQI with HARQ feedback (e.g., with ACK/NACK reporting from the UE 115).

For example, a UE 115 may receive a control message that indicates a resource for reception of a downlink transmission and an uplink control resource for transmission of CQI information (e.g., a CQI report, SNR information, a CSI report, etc.). The UE 115 may identify a DMRS of the downlink transmission, and calculate a CQI based on the DMRS. The UE may then transmit the calculated CQI to the base station 105 via the uplink control resource indicated by the control message received from the base station 105. In some cases, the CQI information may be transmitted with HARQ feedback using the uplink control resource (e.g., the UE may multiplex the CQI with an ACK/NACK corresponding to the downlink transmission). In other cases, the control message may indicate separate uplink resources for each of the CQI and the HARQ feedback. Such may provide for increased effectiveness of the base station 105 and UE 115 being able to satisfy reliability and latency targets for a particular application or service (e.g., such as URLLC). The UE 115 calculating CQI based on DMRS of the downlink transmission (e.g., based on DMRS of PDSCH configured by a control message from a base station 105) may provide for a base station 105 being able to more reliably identify resources and configurations for communications with the UE 115, as CQI may be reported faster or more frequently. The UE 115 transmitting CQI (calculated based on identified DMRS) via uplink control resources indicated in the receive control message from the base station 105 may result in increased throughput and reduced latency in wireless communications system 100 (e.g., due to less retransmissions, more successful retransmissions, etc.).

In some cases, the reported CQI may include SNR information associated with the DMRS received by the UE 115. In some cases, the CQI report may include the absolute SNR (e.g., the explicit value of the measured SNR). In other cases, the CQI report may include delta SNR (e.g., a delta SNR value relative to some reference SNR value). For example, CQI reporting of delta SNR may reduce the range of reportable SNR, resulting in less CQI reporting overhead. That is, UE 115 transmission of a delta SNR, where the delta SNR is based at least in part on the measured SNR of the identified DMRS and a reference SNR, may reduce overhead in CQI reporting.

The base station 105 may receive CQI from the UE 115, and may determine resources and configurations for communications with the UE 115 (e.g., the base station 105 may identify a MCS for a next transmission, or in some cases a retransmission, to the UE 115). The faster CQI (e.g., more up to date CQI information for the base station 105) provided by the DMRS based CQI techniques described herein, may in some cases reduce the number of retransmissions, increase the success rate of retransmissions (e.g., as the retransmission may utilize the updated CQI information included with the NACK from the UE 115), etc. In some cases, the base station 105 may also reduce MCS configuration overhead (e.g., MCS bit fields in downlink DCI) once DMRS based CQI is triggered. For example, the base station 105 may indicate a delta MCS (e.g., a delta value from the previous MCS value to the updated MCS value) in DCI, which may reduce the number of bits needed to convey an MCS update to the UE 115. DMRS based CQI may thus provide opportunity for reducing MCS signaling overhead from a base station 105. That is, a base station 105 may identify a MCS offset based on the received CQI, and may transmit an indication of the offset to a UE 115, which may be associated with reduced DCI overhead (e.g., for supporting compact DCI in systems such as URLLC systems).

Figure 2:
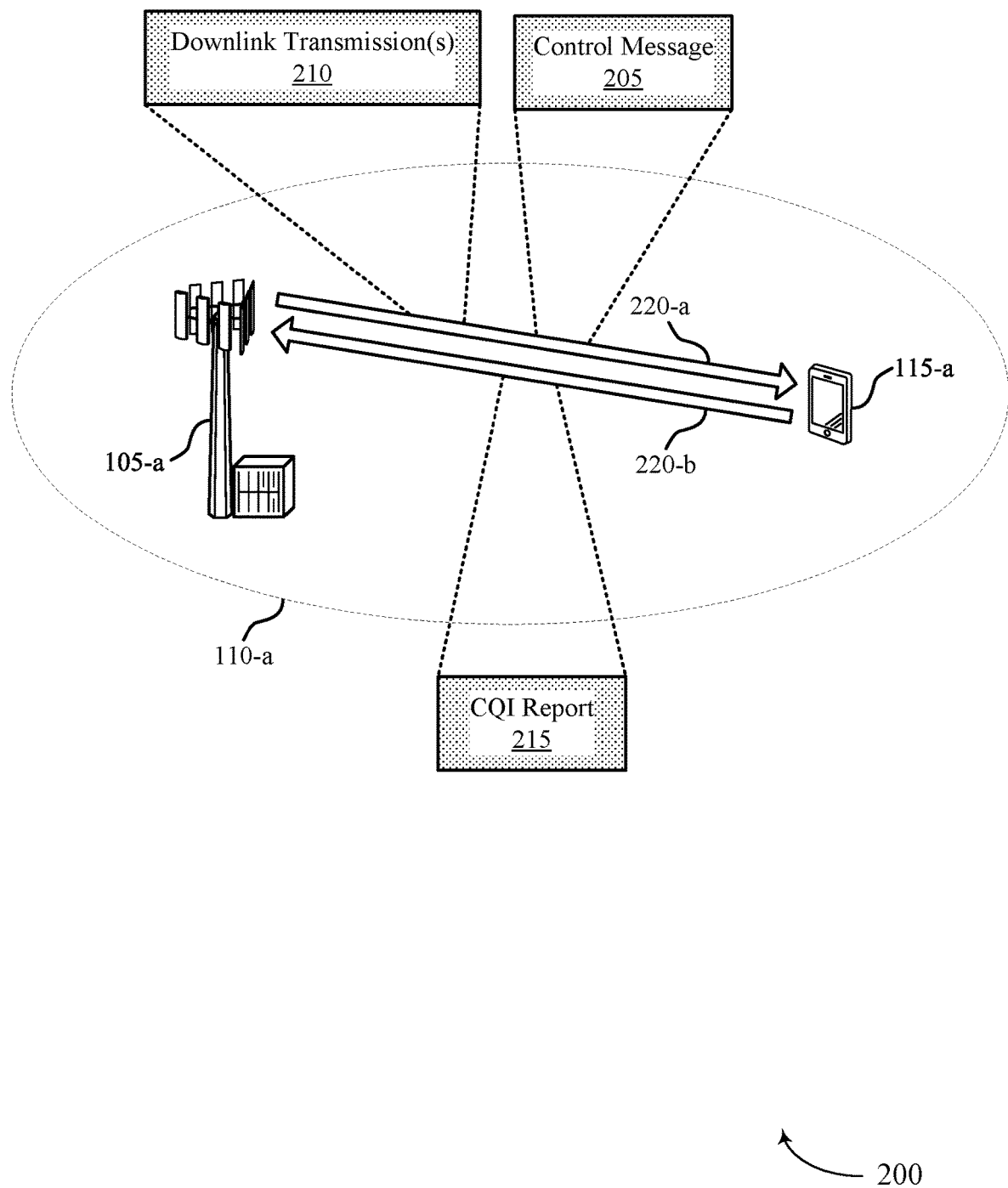
FIG. 2 illustrates an example of a wireless communications system that supports CQI reporting based on DMRS in accordance with aspects of the present disclosure.

FIG. 2 illustrates an example of a wireless communications system 200 that supports CQI reporting based on DMRS in accordance with aspects of the present disclosure. In some examples, wireless communications system 200 may implement aspects of wireless communications system 100. Wireless communications system 200 includes base station 105-*a* and UE 115-*a*, which may be examples of the corresponding devices described with reference to FIG. 1. Base station 105-*a* may communicate with UEs 115 (including UE 115-*a*) within coverage area 110-*a*. For example, base station 105-a may communicate with UE 115-a on resources of carriers 220. In particular, base station 105-a may transmit downlink signals to UE 115-a on resources of a carrier 220-a, and UE 115-a may transmit uplink signals to base station 105-a on resources of a carrier 220-b. In some cases, carrier 220-a and carrier 220-b may be different, and, in other cases, carrier 220-a and carrier 220-b may be the same.

Wireless communications system 200 may implement aspects of wireless communications system 100. For example, wireless communications system 200 may support efficient techniques for UE 115-a CQI reporting based on DMRS received from base station 105-a. In the example of FIG. 2, base station 105-a may transmit a CQI report configuration to UE 115-a, which may indicate a configuration for a CQI report 215 to be transmitted by UE 115-a to base station 105-a. For example, the CQI report configuration may configure the UE 115-a to calculate and report CQI based on DMRS. In some cases, the CQI configuration may further configure UE 115-a to report the DMRS based CQI with HARQ feedback. The CQI configuration may further indicate what information the UE 115-a is to include in the CQI report 215. For example, the CQI configuration may configure the UE 115-a to transmit absolute SNR, delta SNR, averaged CQI, maximum CQI variation (e.g., in cases where multiple PDSCH indicate the same PUCCH), etc.

In general, the CSI calculation may be based on DMRS and/or PDSCH. For example, UE 115-a may decode PDSCH and incorporate PDSCH symbols into a CQI calculation. Alternatively, UE 115-a may calculate CQI based on DMRS in addition to SNR of the first few symbols of PDSCH (e.g., without decoding the whole PDSCH). In some cases, the techniques described herein referring to CQI may be applied to other types of CSI by analogy, without departing from the scope of the present disclosure. For example, in some cases, CSI may include or refer to CQI, precoding matrix indicator (PMI), precoding type indicator (PTI), rank indication (RI), or other types of channel state information.

Base station 105-a may indicate resources for DMRS based CQI reporting by UE 115-a. For example, base station 105-a may transmit a control message 205 (e.g., PDCCH) to the UE 115-a. The control message 205 may grant (e.g., allocate resources for) downlink transmission(s) 210 (e.g., one or more PDSCHs), and may indicate an uplink control resource (e.g., PUCCH) for CQI reporting. The UE 115-a may identify one or more downlink transmissions 210 (e.g., one or more PDSCHs) based on the received control message 205. Additionally, the UE 115-a may identify uplink control resources for transmission of CQI report 215 and HARQ feedback corresponding to the downlink transmission 210.

In some examples, the base station 105-a may indicate (e.g., via control message 205) a single PUCCH resource for CQI and ACK/NACK multiplexing. The UE 115-a may identify the PUCCH resource, and multiplex calculated CQI and an ACK or a NACK associated with the downlink transmission 210, on the identified PUCCH resource. In such cases, a larger PUCCH payload may include the multiplexed HARQ and CQI. In other examples, base station 105-a may indicate (e.g., via control message 205) a PUCCH resource for CQI and a PUCCH resource for HARQ (e.g., the base station 105-a may indicate separate or different resource block (RB) allocations and/or different timing for CQI and HARQ). In such examples where CQI and HARQ are associated with different PUCCH, the control message 205 may indicate two PUCCH resource addresses (e.g., one for CQI and one for ACK/NACK). In some cases, the control message 205 may alternatively include one PUCCH address (e.g., for ACK/NACK) as well as a time offset to indicate a second PUCCH (e.g., for CQI). For example, to avoid adding additional DCI bits (e.g., to avoid adding additional DCI overhead) needed for indicating a second PUCCH, base station 105-a may indicate a time offset (e.g., via RRC signaling) indicating the second PUCCH. A UE 115-a may receive or identify the time offset (e.g., via RRC configuration) and apply the time offset for CQI on the HARQ resource. The time offset may be positive (e.g., where the CQI is transmitted after the ACK/NACK) or negative (e.g., where the CQI is transmitted before the ACK/NACK). As such, a base station 105-a may dynamically indicate (e.g., via RRC configuration of a time offset, via inclusion of a second PUCCH resource for CQI in a control message 205, etc.) to UE 115-a to include CQI with HARQ feedback (e.g., such that CQI associated with ACK/NACK is encoded).

In some cases, a CQI report 215 from UE 115-a may only be associated with a ACK. For example, if UE 115-a is able to successfully receive and decode downlink transmission 210, no CQI may be reported. Once UE 115-a is unable to successfully receive and decode downlink transmission 210, CQI bits may be presented (e.g., a NACK may be a multi-state NACK, where each state represents a specific CQI). In other cases, a CQI report 215 from UE 115-a may be associated with both ACK and NACK (e.g., the UE 115-a may transmit CQI with HARQ feedback regardless of whether the UE 115-a is indicating an ACK or NACK for the downlink transmission 210).

In some examples, wireless communications system 200 may support early ACK/NACK via the DMRS based CQI techniques described herein. For example, CQI calculated by UE 115-a (e.g., based on DMRS received from base station 105-a) may indicate an ACK or a NACK associated with downlink transmission(s) 210 (e.g., the CQI included in CQI report 215 may serve as an early ACK/NACK). As the CQI may be feedback to base station 105-a earlier than regular ACK/NACK (e.g., which may be determined based on decoding of the remainder of the downlink transmission after the DMRS), the latency of wireless communications system 200 may be reduced. For example, in cases where the CQI indicates an early NACK, base station 105-a may proceed to retransmit the downlink transmission (e.g., proceed to retransmit using the same MCS, proceed to determine a new MCS and retransmit using the new MCS, etc.) without waiting for the UE 115-a to decode the full downlink transmission and transmit regular ACK/NACK to the base station 105-a. In some cases, CQI may indicate an early ACK/NACK explicitly (e.g., an extra toggle bit may be included in the CQI report to indicate either an ACK or a NACK, based on the received DMRS). In other cases, the CQI report may indicate an early ACK/NACK implicitly (e.g., the base station 105-a may identify whether indicated CQI serves as an early ACK or an early NACK). For example, CQI may implicitly indicate an early ACK based on the delta SNR, absolute SNR, etc. exceeding some threshold, may implicitly indicate an early NACK based on the delta SNR, absolute SNR, etc. being below some threshold, may implicitly indicate an early ACK if the indicated CQI does not instigate a change in MCS by base station 105-a, may implicitly indicate an early NACK if the indicated CQI does instigate a change in MCS by base station 105-a, etc.

UE 115-a may report delta SNR in CQI report 215, where the delta SNR is a delta value to some reference SNR corresponding to the scheduling MCS (e.g., the initial scheduling MCS SNR). Such delta SNR reporting may reduce the codebook size associated with CQI report 215 (e.g., such a feedback compression scheme may reduce the range of delta SNR to use less bits in CQI report 215). In some cases, the reference SNR for the MCS may be RRC configured, or predefined (e.g., hardcoded in a specification for a RAT used by the UE 115-a). In some cases, when the downlink transmission 210 is a retransmission with a special MCS (e.g., when only a mod order is indicated), the initial transmission MCS may be used as reference (e.g., the SNR in the initial transmission may be the reference SNR). In other examples, the reference SNR may be the SNR of the previous DMRS. In other examples, the reference SNR may be the SNR from the previously requested CQI (e.g., the SNR from the latest or most recent CSI-RS computation). In some of such examples, the reported precoding matrix and rank may match what the base station 105-a is using. If the base station 105-a chooses to pick another precoder/rank, the reporting may not be direct. Alternatively, the UE 115-a may be indicated to report the absolute SNR from DMRS (e.g., using additional CQI bits for in the CQI report 215 to indicate the absolute SNR value).

In some cases, multiple downlink transmissions 210 (e.g., multiple PDSCH) may indicate the same uplink control resource (e.g., the same PUCCH) for CQI reporting based on DMRS of the multiple downlink transmissions 210. For example, control message 205 may grant multiple PDSCH, and may indicate an uplink control resource for CQI reporting. In such cases, the PUCCH for DMRS based CQI may potentially observe multiple PDSCHs. In some cases, the UE 115-a may report CQI (e.g., absolute or delta) associated with a reference PDSCH. The reference PDSCH may be RRC configured, or may be the latest DMRS (e.g., the CQI reported in the uplink control resource may be associated with the DMRS of a configured reference PDSCH, or may be associated with the most recently received DMRS). In other cases, the base station 105-a may indicate the reference PDSCH (e.g., the PDSCH of which to report CQI for in the uplink control resource indicated by the control message 205) by adding a DCI bit in the control message 205. In yet other cases, the UE 115-a may select which PDSCH (e.g., which DMRS associated with the multiple PDSCH granted by the control message 205) to report CQI for in the uplink control resource. The UE 115-a may indicate which ACK/NACK in the codebook the CQI is for by adding an index field in the uplink control information (UCI).

In other examples, when control message 205 grants multiple PDSCH and indicates an uplink control resource for CQI reporting, the UE 115-a may calculate CQI based on the DMRS for each granted PDSCH. The UE 115-a may then report the averaged CQI computations for all PDSCHs within the PUCCH window, the maximum CQI variation for PDSCHs within the window, etc. In some cases, the UE 115-a may add CQI report bits for each ACK/NACK bit (e.g., by increasing the UCI payload size). In some scenarios, how the UE 115-a handles cases where multiple PDSCH indicate the same PUCCH for CQI report based on DMRS may be configured by the base station 105-a via the CQI reporting configuration, other RRC signaling, etc.

Once base station 105-a receives the CQI report 215 from UE 115-a, base station 105-a may use the information in CQI report 215 to identify resources, configuration, etc. for communicating with UE 115-a. For example, base station 105-a may identify the CQI information (e.g., delta SNR, absolute SNR, SNR offset, MCS offset, etc.) that may be included in the CQI report 215, and base station 105-a may use the CQI information to determine a MCS for a transmission to UE 115-a. As the CQI reports 215 based on DMRS may be accurate and up to date, the base station 105-a may, in some cases, follow the suggested SNR/MCS offset by the UE 115-a for the next transmissions by the base station 105-a. In such cases, the overhead for MCS signaling in DCI may be reduced (e.g., the 5 bits used for MCS in DCI may be reduced, as a delta MCS may be indicated). Such may be desirable in scenarios where compact DCI is desired (e.g., in URLLC). Further, in some examples (e.g., in factory automation settings) where semi-persistent scheduling (SPS) reconfiguration may come with a group PDCCH, the DCI overhead savings may be increased. As such, MCS bit field in DCI may be reduced when CQI reporting based on DMRS is triggered. For example, MCS bit field may be reduced (e.g., to 1 or 2 bits) where the bits used may indicate the offset the UE 115-a may apply to the MCS the UE 115-a previously suggested, the latest configured MCS, or some other reference MCS.

With the introduction of DMRS based CQI (e.g., in addition to SRS/CSI-RS based CQI), the base station 105-a may, in some cases, maintain an outer-loop link adaptation (OLLA) including an internal outer loop (OL) and an external OL. For example, the base station 105-a may run two OLs, one keeping track over SRS/CSI-RS based CQI (e.g., an external OL) and another keeping track or running over DMRS based CQI (e.g., an internal OL). In some cases, the internal OL may be used by the base station 105-a to refine the MCS selected by the external OL. For example, the CQI based on DMRS may be used to refine MCS established by SRS/CSI-RS based CQI. In some cases, the internal OL may also identify a bursty interference (e.g., the external OL may be updated independent of the DMRS based OL).

The above described techniques for UE 115 calculating CQI based on DMRS of the downlink transmission (e.g., based on DMRS of PDSCH configured by a control message from a base station 105) may provide for a base station 105 being able to more reliably identify resources and configurations for communications with the UE 115, as CQI may be reported faster or more frequently. For example, as DMRS may be included in the first few symbols of a PDSCH assignment, CQI measurements based on DMRS may be much faster than CSI reporting/measurement based on SRS or CSI-RS. The UE 115 transmitting CQI (calculated based on identified DMRS) via uplink control resources indicated in the receive control message from the base station 105 may result in increased throughput and reduced latency in wireless communications system 100 (e.g., due to less retransmissions, more successful retransmissions, etc.).

Figure 3:
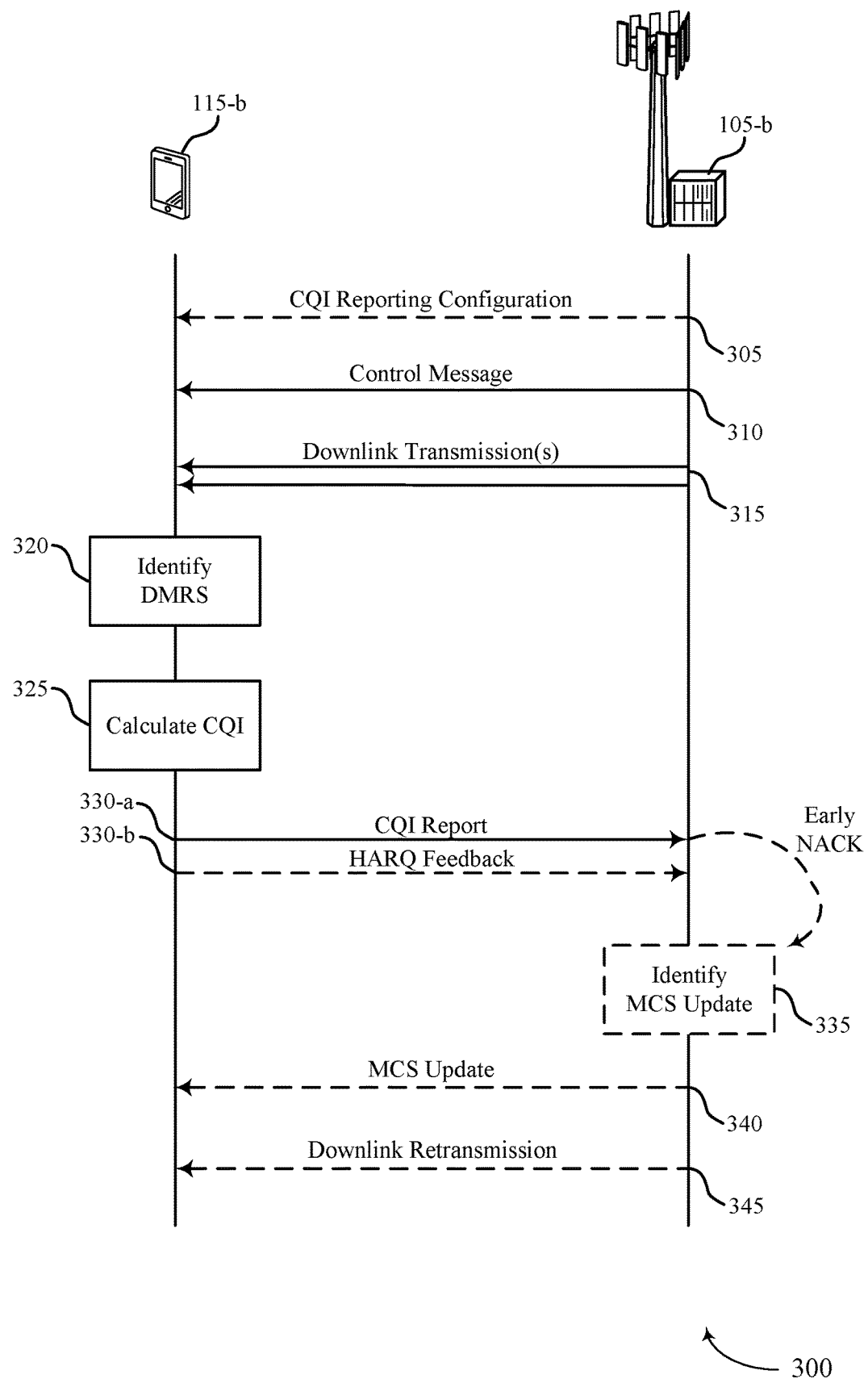
FIG. 3 illustrates an example of a process flow that supports CQI reporting based on DMRS in accordance with aspects of the present disclosure.

FIG. 3 illustrates an example of a process flow 300 that supports CQI reporting based on DMRS in accordance with aspects of the present disclosure. In some examples, process flow 300 may implement aspects of wireless communications system 100 and wireless communications system 200. For example, the process flow 300 includes a UE 115-b and a base station 105-b, that may be examples of the corresponding devices described with reference to FIGS. 1 and 2. The process flow 300 may illustrate an example of base station 105-b configuring UE 115-b for DMRS based CQI reporting. In the following description of the process flow 300, the operations between the base station 105-b and the UE 115-b may be transmitted in a different order than the exemplary order shown, or the operations performed by base station 105-b and UE 115-b may be performed in different orders or at different times. In some cases, certain operations may also be left out of the process flow 300, or other operations may be added to the process flow 300.

At 305, base station 105-*b* may, in some cases, transmit a CQI reporting configuration to UE 115-*b*. The CQI reporting configuration may configure the UE 115-*a* to report CQI based on DMRS. For example, the UE 115-*a* may identify DMRS (e.g., identify reference PDSCH), calculate CQI based on DMRS measurements, report CQI with HARQ feedback, etc. based on the CQI reporting configuration. In some cases, base station 105-*b* may transmit the CQI reporting configuration via RRC signaling.

At 310, base station 105-*b* may transmit a control message (e.g., PDCCH) to UE 115-*b*. The control message may indicate a resource for UE 115-*b* reception of a downlink transmission and an uplink control resource for UE 115-*a* transmission of CQI. For example, the control message may grant one or more PDSCHs, and indicate PUCCH for a CQI report from UE 115-*a*. In some cases, the control message may include an indication (e.g., a CQI report indication) of which PDSCH is to be associated with the CQI report from the UE 115-*b*. For example, in scenarios where the control transmission grants multiple PDSCH, the base station may include the CQI report indication to indicate a PDSCH for UE 115-*a* to identify a DMRS (e.g., associated with the indicated PDSCH) for CQI reporting. In some cases, the CQI report indication may be included in DCI of the control message.

At 315, base station 105-*b* may transmit one or more downlink transmissions (e.g., one or more PDSCHs) to UE 115-*b*. In some examples, each PDSCH may include a DMRS (e.g., in the first few symbols of the PDSCH assignment) to facilitate decoding of the PDSCH by UE 115-*b*.

At 320, UE 115-*b* may identify a DMRS (e.g., or in some cases multiple DMRS) of the one or more downlink transmissions based at least in part on the control message received at 310. In some cases, identifying the DMRS may include identifying a reference PDSCH associated with the downlink transmission, wherein the DMRS is identified based at least in part on the reference PDSCH. In some cases, identifying the DMRS may include identifying a most recent DMRS (e.g., a most recently received DMRS). In some cases, identifying the DMRS may include identifying a CQI report indication (e.g., included in the control message received at 310), wherein the CQI report indication is associated with a PDSCH transmission of the downlink transmissions, and identifying the DMRS based on the indicated PDSCH transmission.

At 325, UE 115-*b* may calculate CQI based on the identified DMRS. In some cases, calculating CQI may include measuring SNR of the identified DMRS. In examples where multiple PDSCH are associated with the uplink control resource (e.g., PUCCH window) indicated by the control message, the UE 115-*b* may, in some cases, calculate CQI based on multiple identified DMRS (e.g., each associated with one of the multiple PDSCH). In such cases, calculating the CQI may further include averaging the multiple calculated CQI, determining a maximum CQI variance, etc.

At 330, UE 115-*b* may transmit the CQI with HARQ feedback. In some cases, UE 115-*b* may multiplex the calculated CQI with an ACK/NACK associated with the downlink transmission (e.g., on the uplink control resource indicated by the control message). In other cases, the UE 115-*b* may transmit HARQ feedback on a first PUCCH resource and may transmit CQI on a second PUCCH resource (e.g., in cases where the control message indicated two PUCCH resources for separate CQI and HARQ, in cases where the control message indicates PUCCH resource for HARQ and the base station 105-*b* signals a time offset in RRC, etc.). In some cases, the CQI report may include a delta SNR, and absolute SNR, etc.

In some examples, the CQI transmitted at 330-*a* may serve as the ACK/NACK associated with the downlink transmission. In some cases, such may be referred to as an early ACK/NACK. In such examples, UE 115-*b* may calculate CQI and feedback the CQI (e.g., via a CQI report), where the CQI may indicate an ACK or a NACK of the downlink transmission received at 315 (e.g., the CQI may serve as either an early ACK or an early NACK). CSI based on DMRS may thus serve as an early ACK/NACK (e.g., the CQI may indicate ACK/NACK prior to regular ACK/NACK based on the decoding of the downlink transmission, which may or may not be then transmitted at 330-*b*).

At 335, base station 105-*b* may, in some cases, identify an MCS update based on the CQI report received at 330. For example, in some cases, the base station 105-*b* may identify an MCS offset from a reference MCS (e.g., a MCS determined from previous SRS/CSI-RS based CQI, a MCS used for an initial transmission, etc.) based on the CQI report received at 330. In some cases, base station 105-*b* may identify an MCS update based on an internal OL (e.g., an internal loop link adaptation) maintained by the base station 105-*b*.

At 340, base station 105-*b* may, in some cases, transmit the MCS update to UE 115-*b*. In some cases, the transmitted MCS may include a delta MCS (e.g., a delta value from some default MCS). In some cases, the MCS (e.g., the delta MCS) may be transmitted in DCI.

In some cases (e.g., when the CQI transmitted at 330-*a* indicates and early NACK), base station 105-*b* may retransmit the downlink transmission at 345 (e.g., without waiting for UE 115-*b* to transmit the HARQ feedback at 330-*b*). For example, the base station 105-*a* may receive the CQI report at 330-*a*, identify the CQI indicates a NACK associated with the downlink transmission transmitted at 315, and proceed to identify a new MCS (e.g., at 335) and retransmit the downlink transmission (e.g., at 345) without waiting to receive the HARQ feedback at 330-*b* (e.g., as the base station 105-*b* may already be aware of the early NACK based on the CQI received from UE 115-*b* in response to the downlink transmission).

Figure 4:
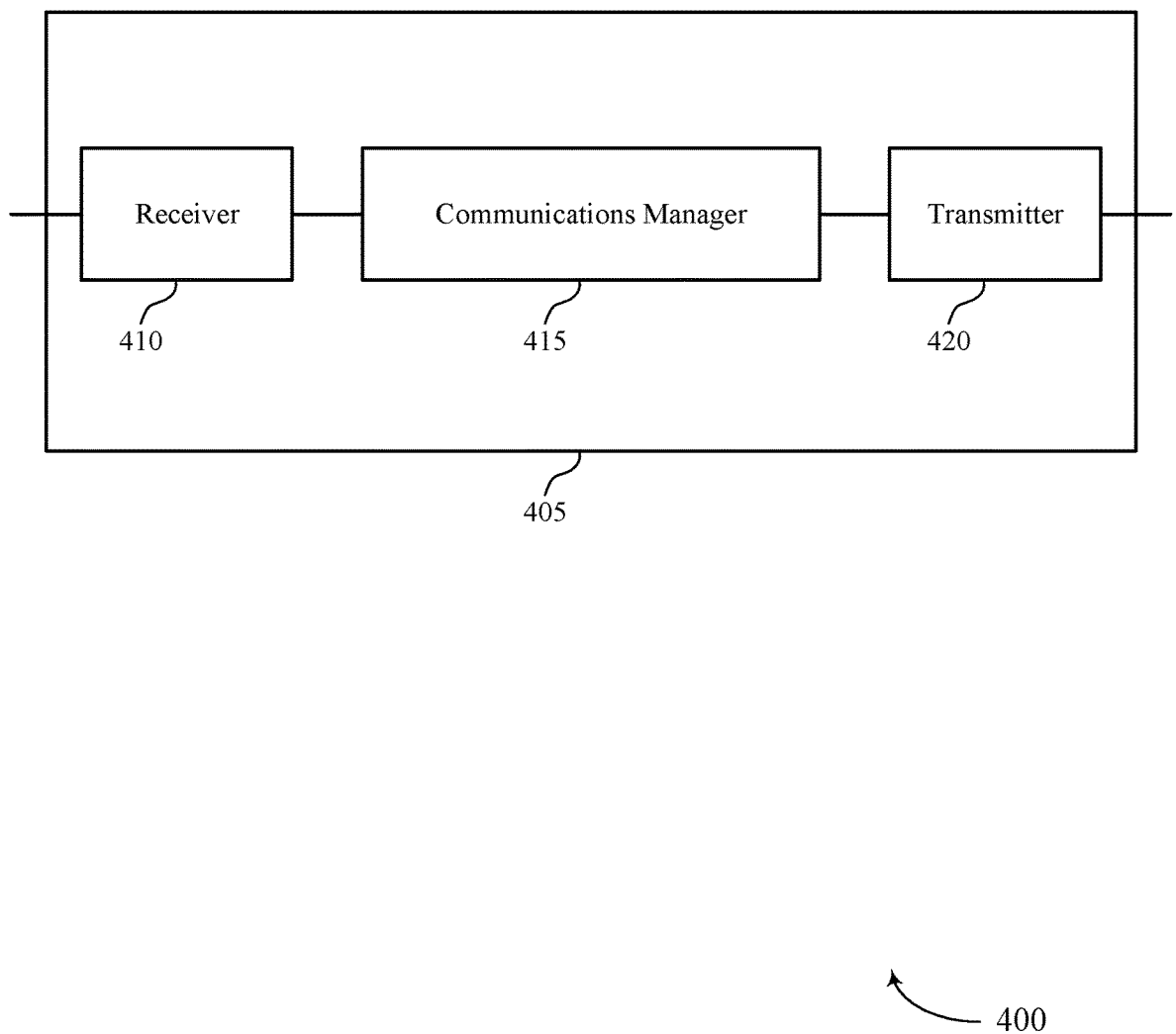
FIGS. 4 and 5 show block diagrams of devices that support CQI reporting based on DMRS in accordance with aspects of the present disclosure.

FIG. 4 shows a block diagram 400 of a device 405 that supports CQI reporting based on DMRS in accordance with aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to CQI reporting based on DMRS, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive a control message that indicates a resource for reception of a downlink transmission and a first uplink control resource for transmission of a CQI, identify a DMRS of the downlink transmission based on the control message, calculate the CQI based on the identified DMRS, and transmit the calculated CQI via the first uplink control resource. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 420 may transmit signals generated by other components of the device 405. In some examples, the transmitter 420 may be collocated with a receiver 410 in a transceiver module. For example, the transmitter 420 may be an example of aspects of the transceiver 720 described with reference to FIG. 7. The transmitter 420 may utilize a single antenna or a set of antennas.

Figure 5:
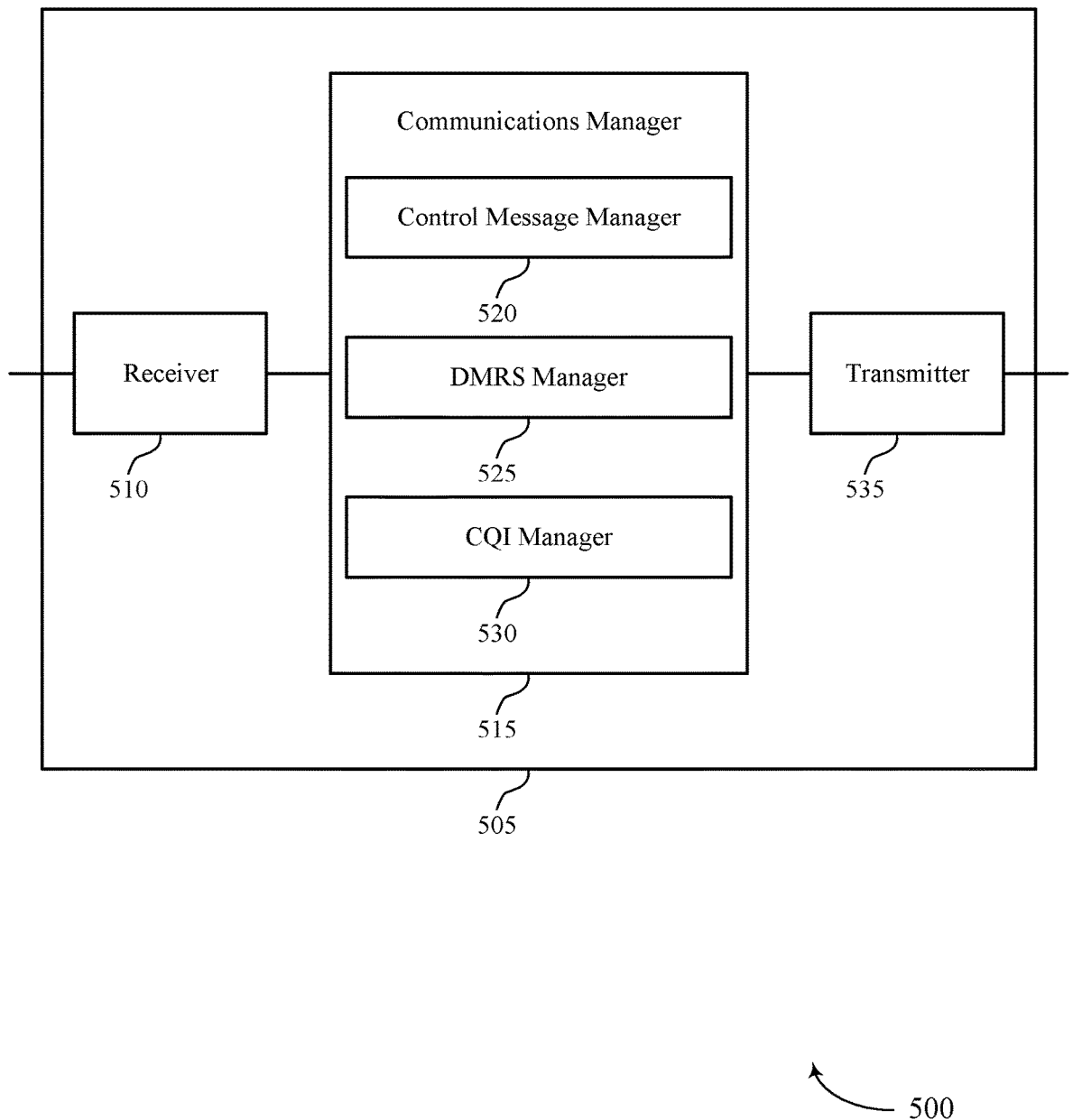

FIG. 5 shows a block diagram 500 of a device 505 that supports CQI reporting based on DMRS in accordance with aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to CQI reporting based on DMRS, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a control message manager 520, a DMRS manager 525, and a CQI manager 530. The communications manager 515 may be an example of aspects of the communications manager 710 described herein.

The control message manager 520 may receive a control message that indicates a resource for reception of a downlink transmission and a first uplink control resource for transmission of a CQI.

The DMRS manager 525 may identify a DMRS of the downlink transmission based on the control message.

The CQI manager 530 may calculate the CQI based on the identified DMRS and transmit the calculated CQI via the first uplink control resource.

The transmitter 535 may transmit signals generated by other components of the device 505. In some examples, the transmitter 535 may be collocated with a receiver 510 in a transceiver module. For example, the transmitter 535 may be an example of aspects of the transceiver 720 described with reference to FIG. 7. The transmitter 535 may utilize a single antenna or a set of antennas.

Figure 6:
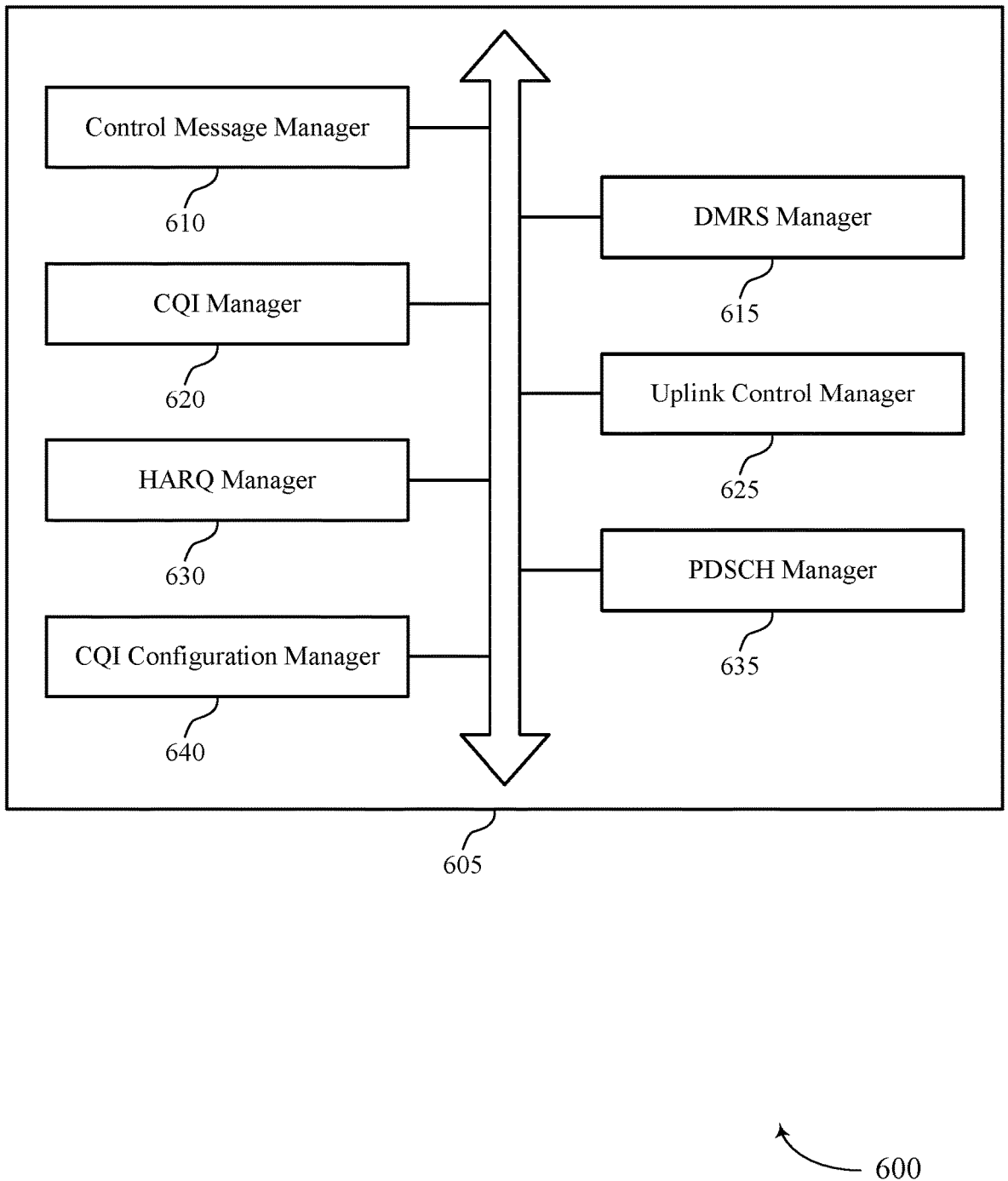
FIG. 6 shows a block diagram of a communications manager that supports CQI reporting based on DMRS in accordance with aspects of the present disclosure.

FIG. 6 shows a block diagram 600 of a communications manager 605 that supports CQI reporting based on DMRS in accordance with aspects of the present disclosure. The communications manager 605 may be an example of aspects of a communications manager 415, a communications manager 515, or a communications manager 710 described herein. The communications manager 605 may include a control message manager 610, a DMRS manager 615, a CQI manager 620, an uplink control manager 625, a HARQ manager 630, a PDSCH manager 635, and a CQI configuration manager 640. Each of these modules may communicate, directly or indirectly, with one another (e.g., via one or more buses).

The control message manager 610 may receive a control message that indicates a resource for reception of a downlink transmission and a first uplink control resource for transmission of a CQI.

The DMRS manager 615 may identify a DMRS of the downlink transmission based on the control message. In some examples, the DMRS manager 615 may measure a SNR of the identified DMRS. In some examples, the DMRS manager 615 may transmit a delta SNR, where the delta SNR is based on the measured SNR of the identified DMRS and a reference SNR. In some examples, the DMRS manager 615 may transmit an absolute SNR, where the absolute SNR is based on the measured SNR of the identified DMRS. In some examples, the DMRS manager 615 may identify a most recent DMRS. In some examples, the DMRS manager 615 may identify the DMRS based on the PDSCH transmission. In some cases, the reference SNR includes an SNR of a configured MCS, an SNR of a previous DMRS, or an SNR of a previous requested CQI.

The CQI manager 620 may calculate the CQI based on the identified DMRS. In some examples, the CQI manager 620 may transmit the calculated CQI via the first uplink control resource. In some examples, the CQI manager 620 may calculate the CQI based on a DMRS associated with the selected PDSCH. In some examples, the CQI manager 620 may calculate a set of CQIs, each CQI based on a DMRS associated with each PDSCH of the set of PDSCHs. In some examples, the CQI manager 620 may identify an average CQI based on the set of calculated CQIs. In some examples, the CQI manager 620 may transmit the average CQI based on the first uplink control resource. In some examples, the CQI manager 620 may identify a maximum CQI variation based on the set of calculated CQIs. In some examples, the CQI manager 620 may transmit the maximum CQI variation based on the first uplink control resource. In some examples, the CQI manager 620 may calculate a set of CQIs, each CQI based on a DMRS associated with each PDSCH of the set of PDSCHs. In some examples, the CQI manager 620 may transmit each of the calculated set of CQIs with a corresponding ACK or a NACK associated with each PDSCH, based on the first uplink control resource. In some examples, the CQI manager 620 may transmit the calculated CQI based on the determination. In some examples, the CQI manager 620 may transmit the calculated CQI with HARQ feedback based on the CQI reporting configuration. In some cases, the calculated CQI includes the determined NACK.

The uplink control manager 625 may multiplex, on the first uplink control resource, the calculated CQI with an ACK or a NACK associated with the downlink transmission. In some examples, the uplink control manager 625 may receive, with the control message, an indication of a second uplink control resource for transmission of HARQ feedback, where the first uplink control resource and the second uplink control resource are different. In some examples, the uplink control manager 625 may receive a timing offset. In some examples, the uplink control manager 625 may identify the first uplink control resource based on the timing offset and the second uplink control resource. In some examples, the uplink control manager 625 may transmit an indication of the selected PDSCH and the calculated CQI based on the first uplink control resource.

In some cases, the transmitted CQI may indicate an ACK (e.g., an early ACK) or a NACK (e.g., an early NACK) of the downlink transmission. In such cases, the PDSCH manager 635 may receive a retransmission of the downlink transmission based at least in part on the transmitted CQI (e.g., based on the transmitted CQI indicating an early NACK).

The HARQ manager 630 may transmit an ACK or a NACK associated with the downlink transmission via the second uplink control resource. In some examples, the HARQ manager 630 may determine a NACK to be sent based on the downlink transmission.

The PDSCH manager 635 may identify a reference PDSCH associated with the downlink transmission, where the DMRS is identified based on the reference PDSCH. In some examples, the PDSCH manager 635 may identify a reference PDSCH associated with the downlink transmission based on the received control message, where the DMRS is identified based on the reference PDSCH. In some examples, the PDSCH manager 635 may identify a set of PDSCHs associated with the downlink transmission. In some examples, the PDSCH manager 635 may select a PDSCH of the set of PDSCHs. In some examples, the PDSCH manager 635 may identify a set of PDSCHs associated with the downlink transmission. In some cases, the set of PDSCHs are within a window of the first uplink control resource.

The CQI configuration manager 640 may receive a CQI reporting configuration for calculating the CQI based on DMRS measurement and transmitting the CQI with HARQ feedback, where the CQI is calculated based on the CQI reporting configuration. In some examples, the CQI configuration manager 640 may identify a CQI report indication based on the control message, where the CQI report indication is associated with a PDSCH transmission. In some cases, the CQI reporting configuration is received via RRC signaling. In some cases, the transmitted CQI corresponds to the PDSCH transmission. In some cases, the CQI report indication includes a DCI bit in the received control message.

Figure 7:
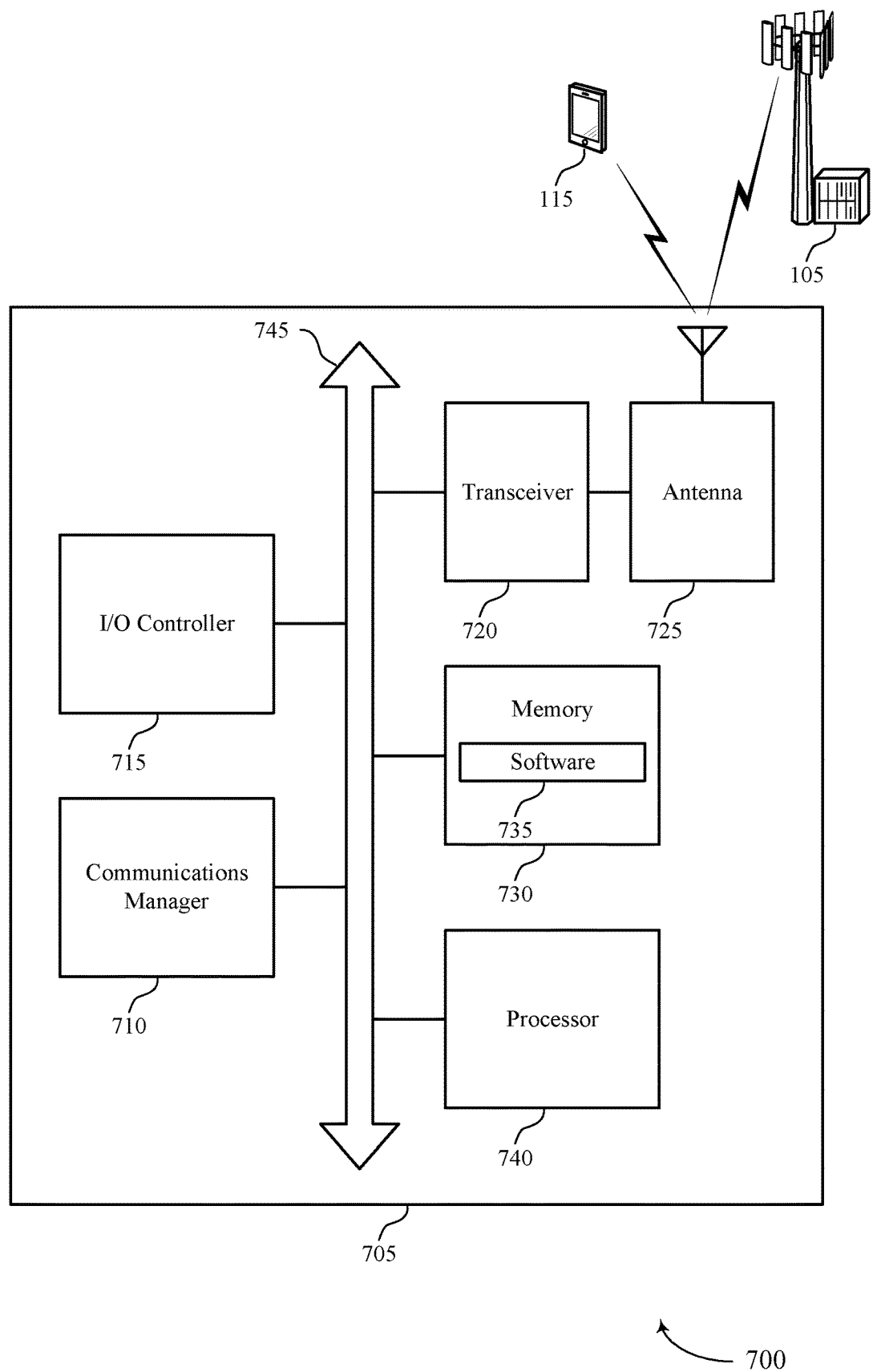
FIG. 7 shows a diagram of a system including a device that supports CQI reporting based on DMRS in accordance with aspects of the present disclosure.

FIG. 7 shows a diagram of a system 700 including a device 705 that supports CQI reporting based on DMRS in accordance with aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive a control message that indicates a resource for reception of a downlink transmission and a first uplink control resource for transmission of a CQI, identify a DMRS of the downlink transmission based on the control message, calculate the CQI based on the identified DMRS, and transmit the calculated CQI via the first uplink control resource.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include RAM and ROM. The memory 730 may store computer-readable, computer-executable code or software 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, a FPGA, a PLD, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting CQI reporting based on DMRS).

The software 735 may include instructions to implement aspects of the present disclosure, including instructions to support wireless communications. The software 735 may be stored in a non-transitory computer-readable medium such as system memory or other type of memory. In some cases, the software 735 may not be directly executable by the processor 740 but may cause a computer (e.g., when compiled and executed) to perform functions described herein.

Figure 8:
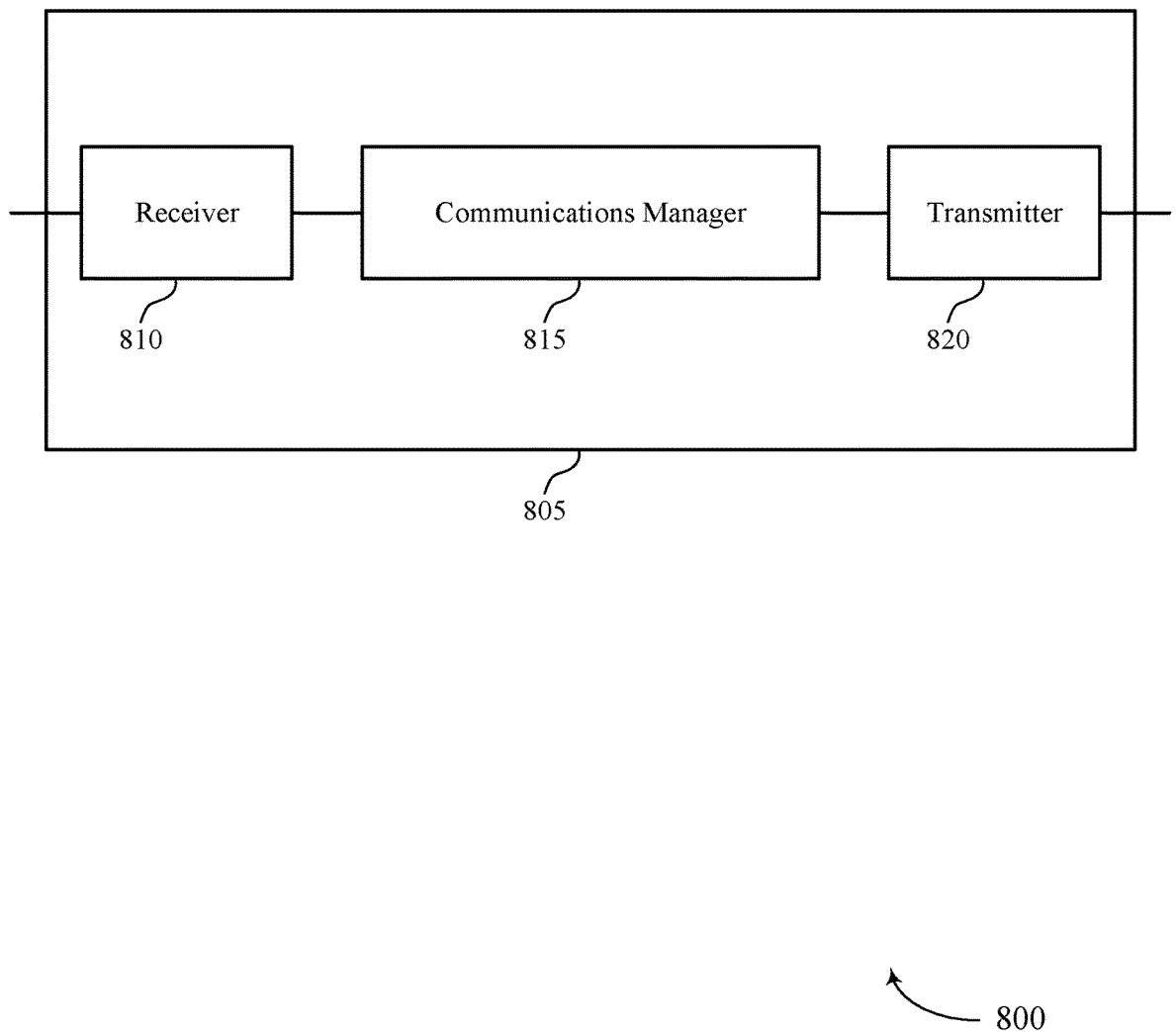
FIGS. 8 and 9 show block diagrams of devices that support CQI reporting based on DMRS in accordance with aspects of the present disclosure.

FIG. 8 shows a block diagram 800 of a device 805 that supports CQI reporting based on DMRS in accordance with aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to CQI reporting based on DMRS, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may transmit a control message that indicates a resource for a downlink transmission and a first uplink control resource for reception of a CQI, transmit the downlink transmission, where the downlink transmission includes a DMRS, and receive the CQI via the first uplink control resource, where the CQI is based on the DMRS. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an ASIC, a FPGA or other PLD, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
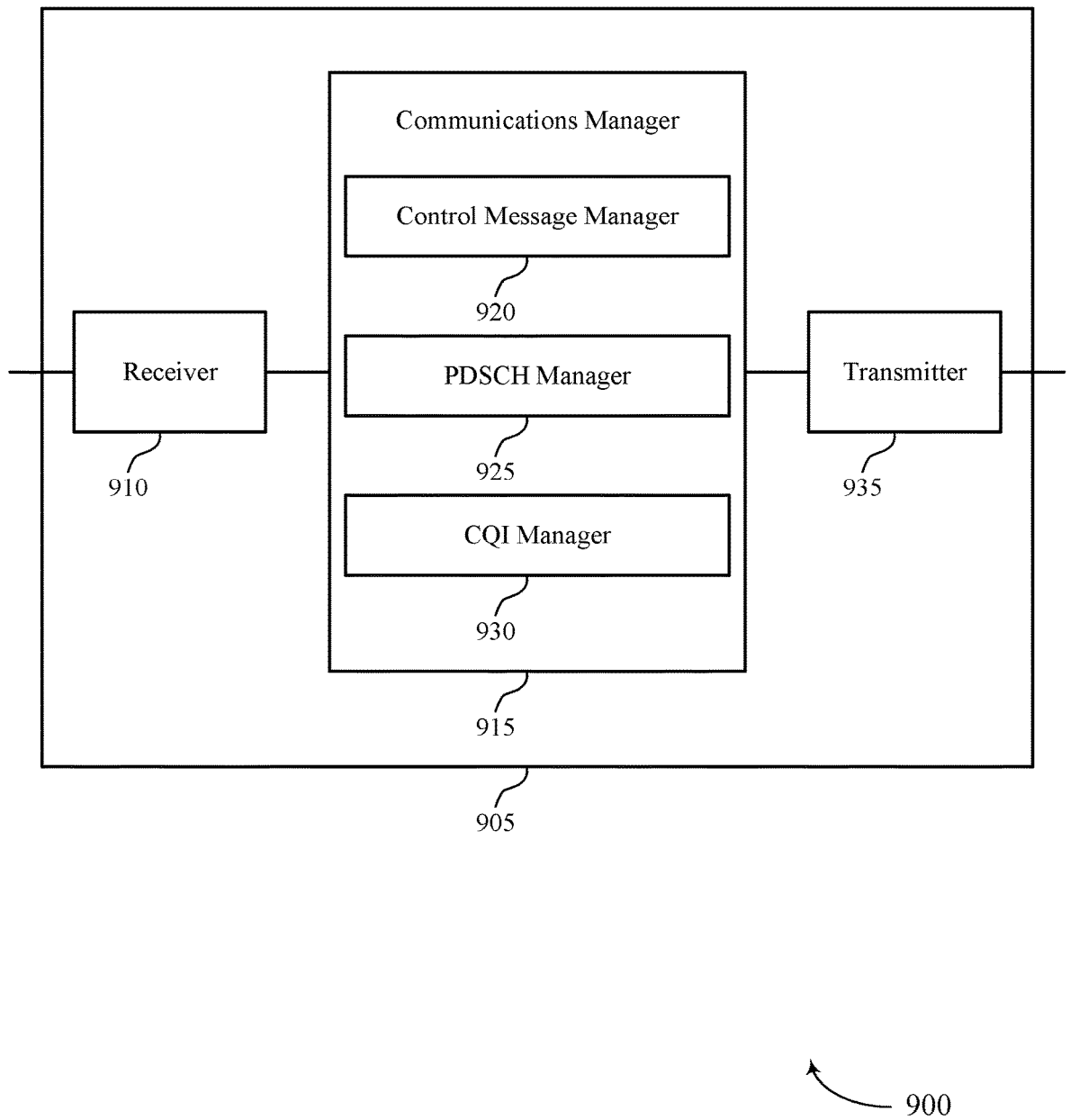

FIG. 9 shows a block diagram 900 of a device 905 that supports CQI reporting based on DMRS in accordance with aspects of the present disclosure. The device 905 may be an example of aspects of a device 805, or a base station 105 as described herein. The device 905 may include a receiver 910, a communications manager 915, and a transmitter 935. The device 905 may also include a processor. Each of these components may be in communication with one another (e.g., via one or more buses).

The receiver 910 may receive information such as packets, user data, or control information associated with various information channels (e.g., control channels, data channels, and information related to CQI reporting based on DMRS, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a control message manager 920, a PDSCH manager 925, and a CQI manager 930. The communications manager 915 may be an example of aspects of the communications manager 1110 described herein.

The control message manager 920 may transmit a control message that indicates a resource for a downlink transmission and a first uplink control resource for reception of a CQI.

The PDSCH manager 925 may transmit the downlink transmission, where the downlink transmission includes a DMRS.

The CQI manager 930 may receive the CQI via the first uplink control resource, where the CQI is based on the DMRS.

The transmitter 935 may transmit signals generated by other components of the device 905. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
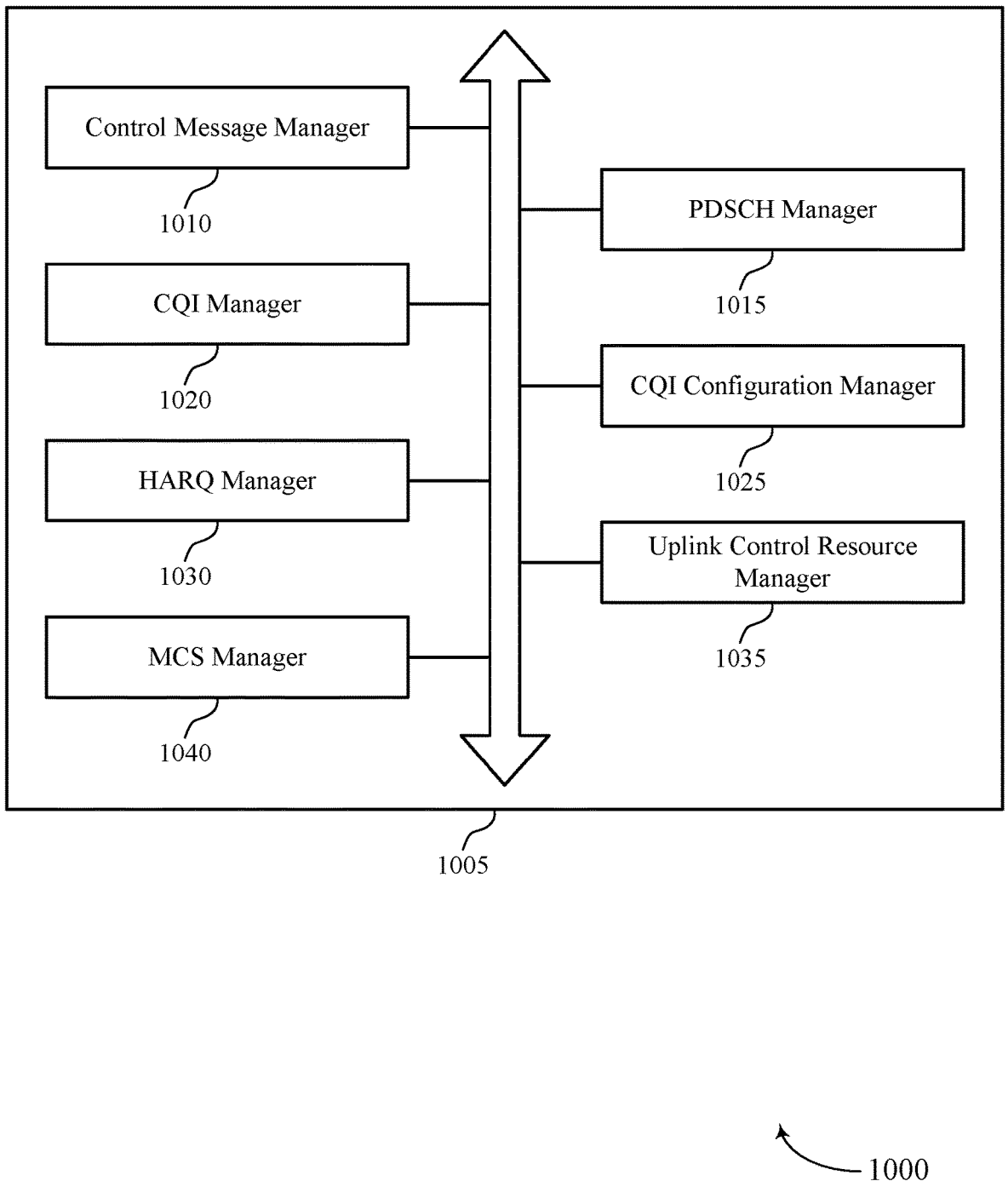
FIG. 10 shows a block diagram of a communications manager that supports CQI reporting based on DMRS in accordance with aspects of the present disclosure.

FIG. 10 shows a block diagram 1000 of a communications manager 1005 that supports CQI reporting based on DMRS in accordance with aspects of the present disclosure. The communications manager 1005 may be an example of aspects of a communications manager 815, a communications manager 915, or a communications manager 1110 described herein. The communications manager 1005 may include a control message manager 1010, a PDSCH manager 1015, a CQI manager 1020, a CQI configuration manager 1025, a HARQ manager 1030, an uplink control resource manager 1035, and a MCS manager 1040. Each of these modules may communicate, directly or indirectly, with one another (e.g., via one or more buses).

The control message manager 1010 may transmit a control message that indicates a resource for a downlink transmission and a first uplink control resource for reception of a CQI. In some examples, the control message manager 1010 may transmit, with the control message, an indication of a second uplink control resource for transmission of HARQ feedback.

The PDSCH manager 1015 may transmit the downlink transmission, where the downlink transmission includes a DMRS.

The CQI manager 1020 may receive the CQI via the first uplink control resource, where the CQI is based on the DMRS. In some examples, the CQI manager 1020 may receive the CQI based on the CQI report indication, where the CQI corresponds to the PDSCH transmission. In some examples, receiving the CQI includes receiving an absolute SNR associated with the DMRS or a delta SNR associated with the DMRS and a reference SNR. In some examples, the CQI manager 1020 may identify an outer loop link adaptation based on CQIs received based on SRSs or CSI-RSs. In some examples, the CQI manager 1020 may identify an internal loop link adaptation based on CQIs received based on DMRS. In some examples, the CQI manager 1020 may identify a bursty interference condition based on the identified inter loop link adaptation. In some cases, the reference SNR includes an SNR of a configured MCS, an SNR of a previous DMRS, or an SNR of a previous requested CQI.

The CQI configuration manager 1025 may transmit a CQI reporting configuration for CQI calculation based on DMRS measurement and CQI reporting with HARQ feedback, where the CQI is received based on the CQI reporting configuration. In some examples, the CQI configuration manager 1025 may transmit a CQI report indication, where the CQI report indication is associated with a PDSCH transmission. In some cases, the CQI reporting configuration is transmitted via RRC signaling. In some cases, the CQI report indication includes a DCI bit in the transmitted control message.

The HARQ manager 1030 may receive an ACK or a NACK associated with the downlink transmission via the first uplink control resource. In some examples, the HARQ manager 1030 may receive an ACK or a NACK associated with the downlink transmission via the second uplink control resource. In some cases, the ACK or the NACK associated with the downlink transmission is multiplexed with the calculated CQI.

In some cases, the received CQI may indicate an ACK (e.g., an early ACK) or a NACK (e.g., an early NACK) of the downlink transmission. In such cases, the PDSCH manager 1015 may transmit a retransmission of the downlink transmission based at least in part on the received CQI (e.g., based on the received CQI indicating an early NACK).

The uplink control resource manager 1035 may identify a timing offset between the first uplink control resource and the second uplink control resource. In some examples, the uplink control resource manager 1035 may transmit the timing offset, where the ACK or the NACK associated with the downlink transmission is received via the second uplink control resource indicated by the timing offset.

The MCS manager 1040 may identify a MCS offset based on the received CQI. In some examples, the MCS manager 1040 may transmit an indication of the MCS offset. In some examples, the MCS manager 1040 may identify a MCS update based on the identified internal loop link adaptation. In some examples, the MCS manager 1040 may transmit an indication of the MCS update.

Figure 11:
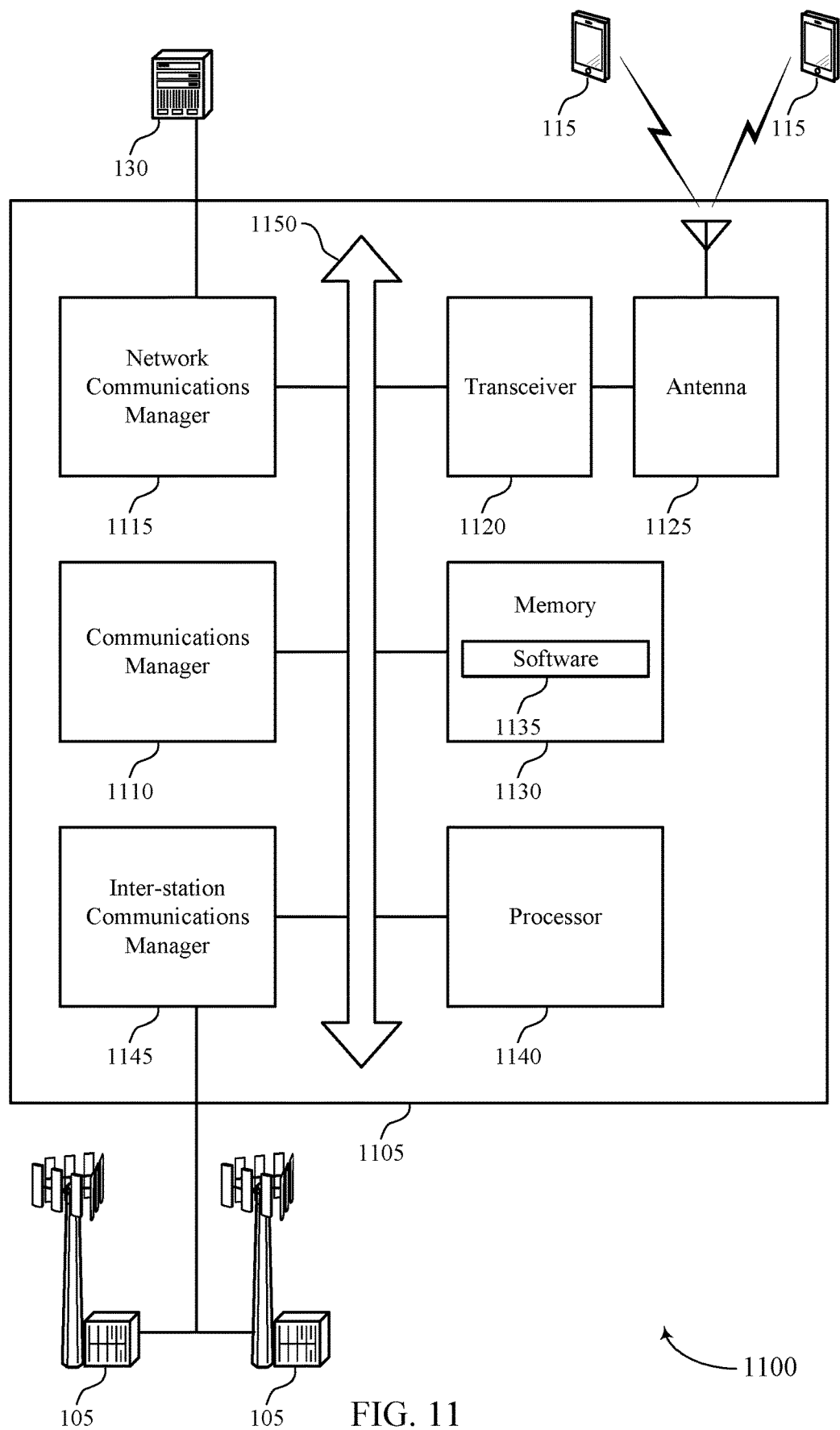
FIG. 11 shows a diagram of a system including a device that supports CQI reporting based on DMRS in accordance with aspects of the present disclosure.

FIG. 11 shows a diagram of a system 1100 including a device 1105 that supports CQI reporting based on DMRS in accordance with aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may transmit a control message that indicates a resource for a downlink transmission and a first uplink control resource for reception of a CQI, transmit the downlink transmission, where the downlink transmission includes a DMRS, and receive the CQI via the first uplink control resource, where the CQI is based on the DMRS.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code or software 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, a FPGA, a PLD, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting CQI reporting based on DMRS).

The inter-station communications manager 1145 may manage communications with other base station 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
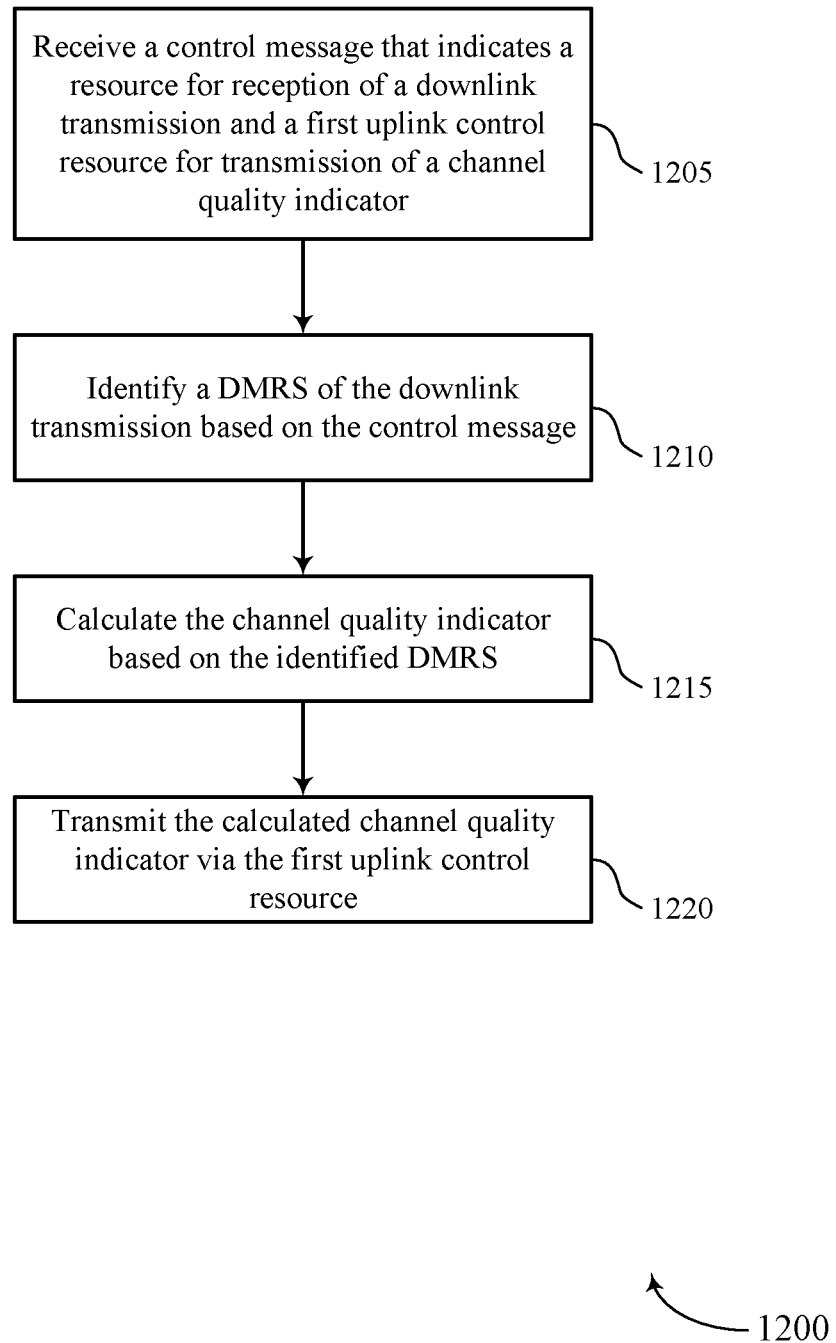
FIGS. 12 through 18 show flowcharts illustrating methods that support CQI reporting based on DMRS in accordance with aspects of the present disclosure.

FIG. 12 shows a flowchart illustrating a method 1200 that supports CQI reporting based on DMRS in accordance with aspects of the present disclosure. The operations of method 1200 may be implemented by a UE 115 or its components as described herein. For example, the operations of method 1200 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1205, the UE may receive a control message that indicates a resource for reception of a downlink transmission and a first uplink control resource for transmission of a CQI. The operations of 1205 may be performed according to the methods described herein. In some examples, aspects of the operations of 1205 may be performed by a control message manager as described with reference to FIGS. 4 through 7.

At 1210, the UE may identify a DMRS of the downlink transmission based on the control message. The operations of 1210 may be performed according to the methods described herein. In some examples, aspects of the operations of 1210 may be performed by a DMRS manager as described with reference to FIGS. 4 through 7.

At 1215, the UE may calculate the CQI based on the identified DMRS. The operations of 1215 may be performed according to the methods described herein. In some examples, aspects of the operations of 1215 may be performed by a CQI manager as described with reference to FIGS. 4 through 7.

At 1220, the UE may transmit the calculated CQI via the first uplink control resource. The operations of 1220 may be performed according to the methods described herein. In some examples, aspects of the operations of 1220 may be performed by a CQI manager as described with reference to FIGS. 4 through 7.

Figure 13:
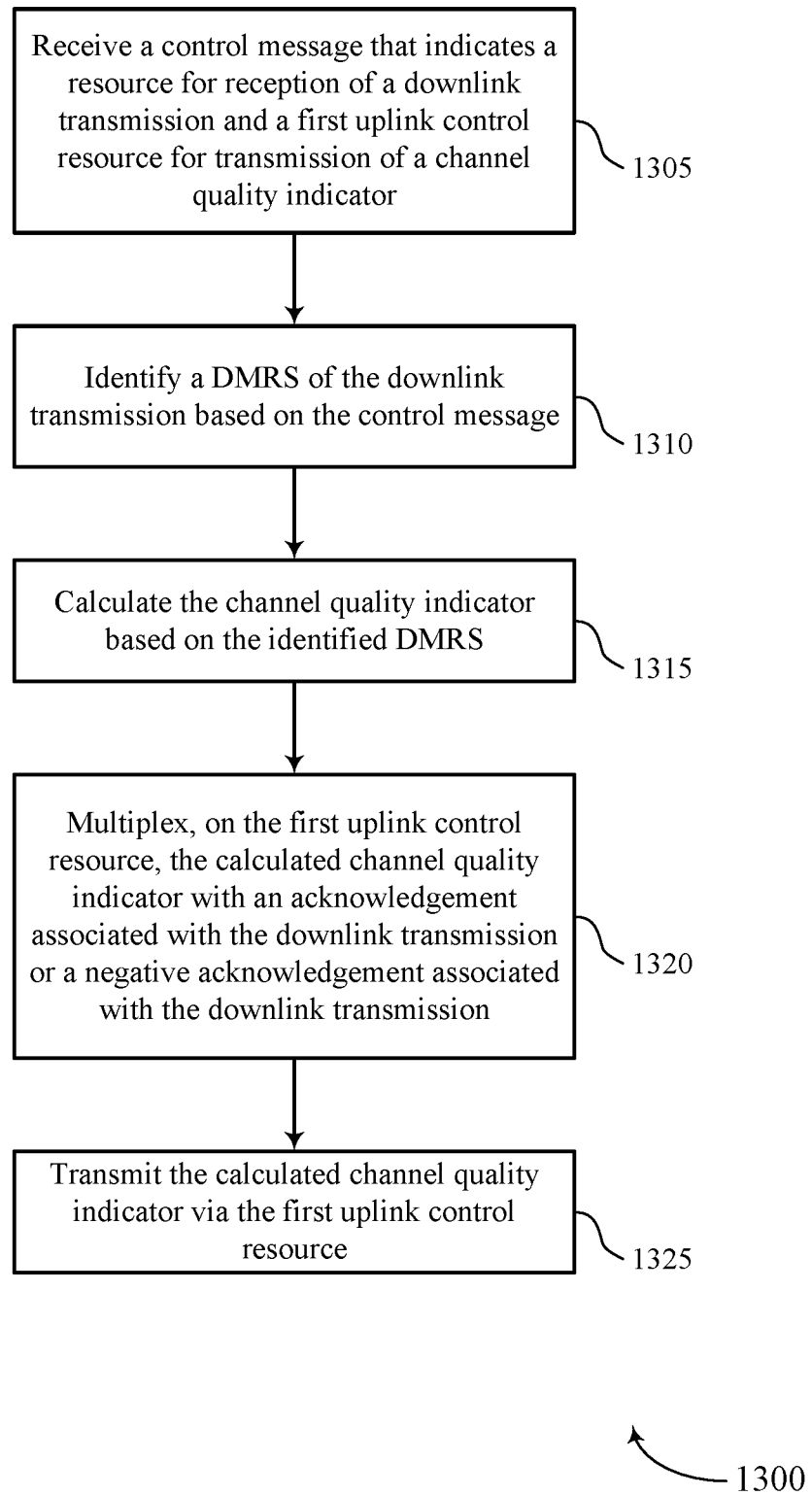

FIG. 13 shows a flowchart illustrating a method 1300 that supports CQI reporting based on DMRS in accordance with aspects of the present disclosure. The operations of method 1300 may be implemented by a UE 115 or its components as described herein. For example, the operations of method 1300 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1305, the UE may receive a control message that indicates a resource for reception of a downlink transmission and a first uplink control resource for transmission of a CQI. The operations of 1305 may be performed according to the methods described herein. In some examples, aspects of the operations of 1305 may be performed by a control message manager as described with reference to FIGS. 4 through 7.

At 1310, the UE may identify a DMRS of the downlink transmission based on the control message. The operations of 1310 may be performed according to the methods described herein. In some examples, aspects of the operations of 1310 may be performed by a DMRS manager as described with reference to FIGS. 4 through 7.

At 1315, the UE may calculate the CQI based on the identified DMRS. The operations of 1315 may be performed according to the methods described herein. In some examples, aspects of the operations of 1315 may be performed by a CQI manager as described with reference to FIGS. 4 through 7.

At 1320, the UE may multiplex, on the first uplink control resource, the calculated CQI with an ACK or a NACK associated with the downlink transmission. The operations of 1320 may be performed according to the methods described herein. In some examples, aspects of the operations of 1320 may be performed by an uplink control manager as described with reference to FIGS. 4 through 7.

At 1325, the UE may transmit the calculated CQI via the first uplink control resource. The operations of 1325 may be performed according to the methods described herein. In some examples, aspects of the operations of 1325 may be performed by a CQI manager as described with reference to FIGS. 4 through 7.

Figure 14:
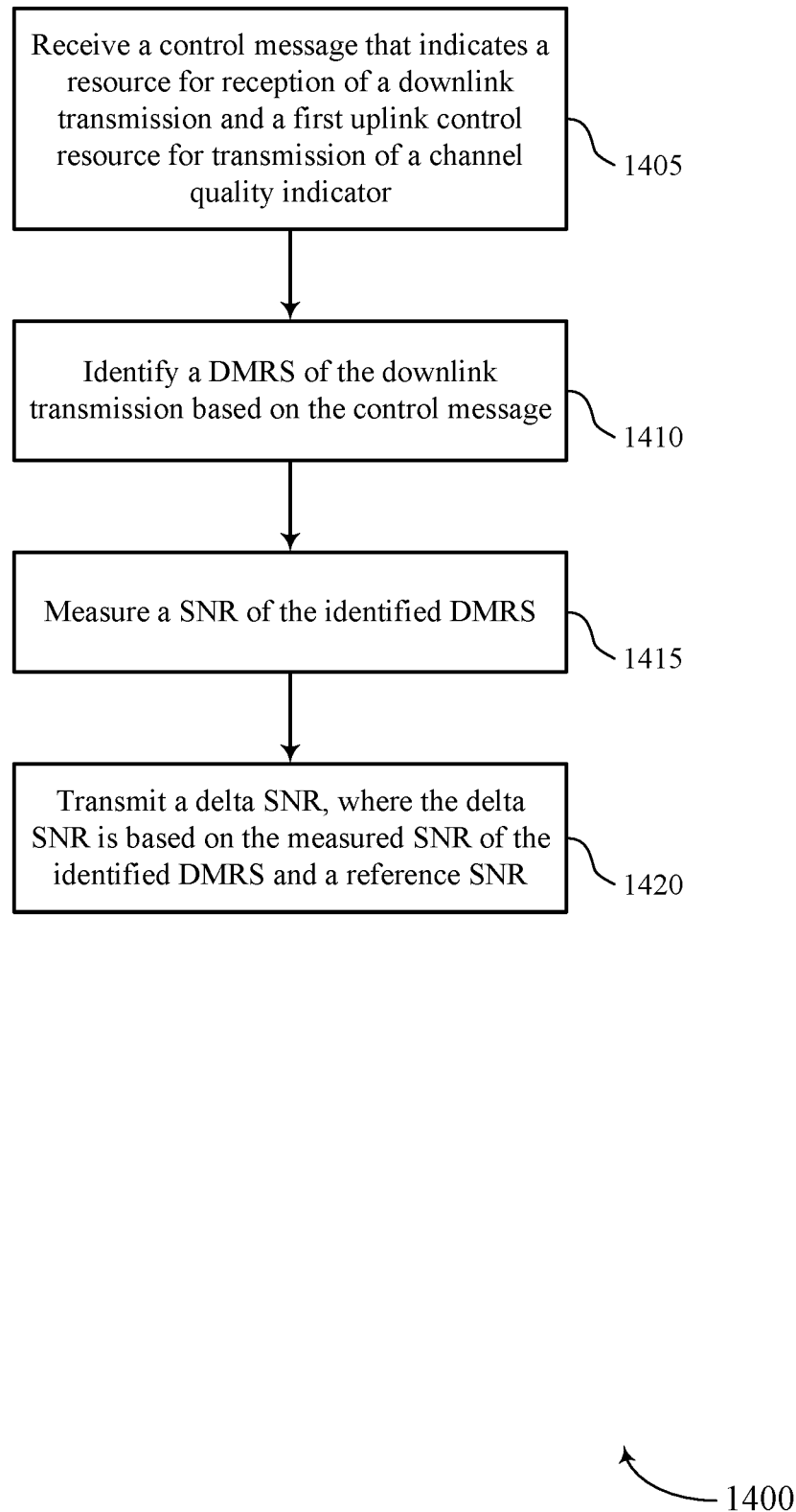

FIG. 14 shows a flowchart illustrating a method 1400 that supports CQI reporting based on DMRS in accordance with aspects of the present disclosure. The operations of method 1400 may be implemented by a UE 115 or its components as described herein. For example, the operations of method 1400 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1405, the UE may receive a control message that indicates a resource for reception of a downlink transmission and a first uplink control resource for transmission of a CQI. The operations of 1405 may be performed according to the methods described herein. In some examples, aspects of the operations of 1405 may be performed by a control message manager as described with reference to FIGS. 4 through 7.

At 1410, the UE may identify a DMRS of the downlink transmission based on the control message. The operations of 1410 may be performed according to the methods described herein. In some examples, aspects of the operations of 1410 may be performed by a DMRS manager as described with reference to FIGS. 4 through 7.

At 1415, the UE may measure a SNR of the identified DMRS. The operations of 1415 may be performed according to the methods described herein. In some examples, aspects of the operations of 1415 may be performed by a DMRS manager as described with reference to FIGS. 4 through 7.

At 1420, the UE may transmit a delta SNR, where the delta SNR is based on the measured SNR of the identified DMRS and a reference SNR. The operations of 1420 may be performed according to the methods described herein. In some examples, aspects of the operations of 1420 may be performed by a DMRS manager as described with reference to FIGS. 4 through 7.

Figure 15:
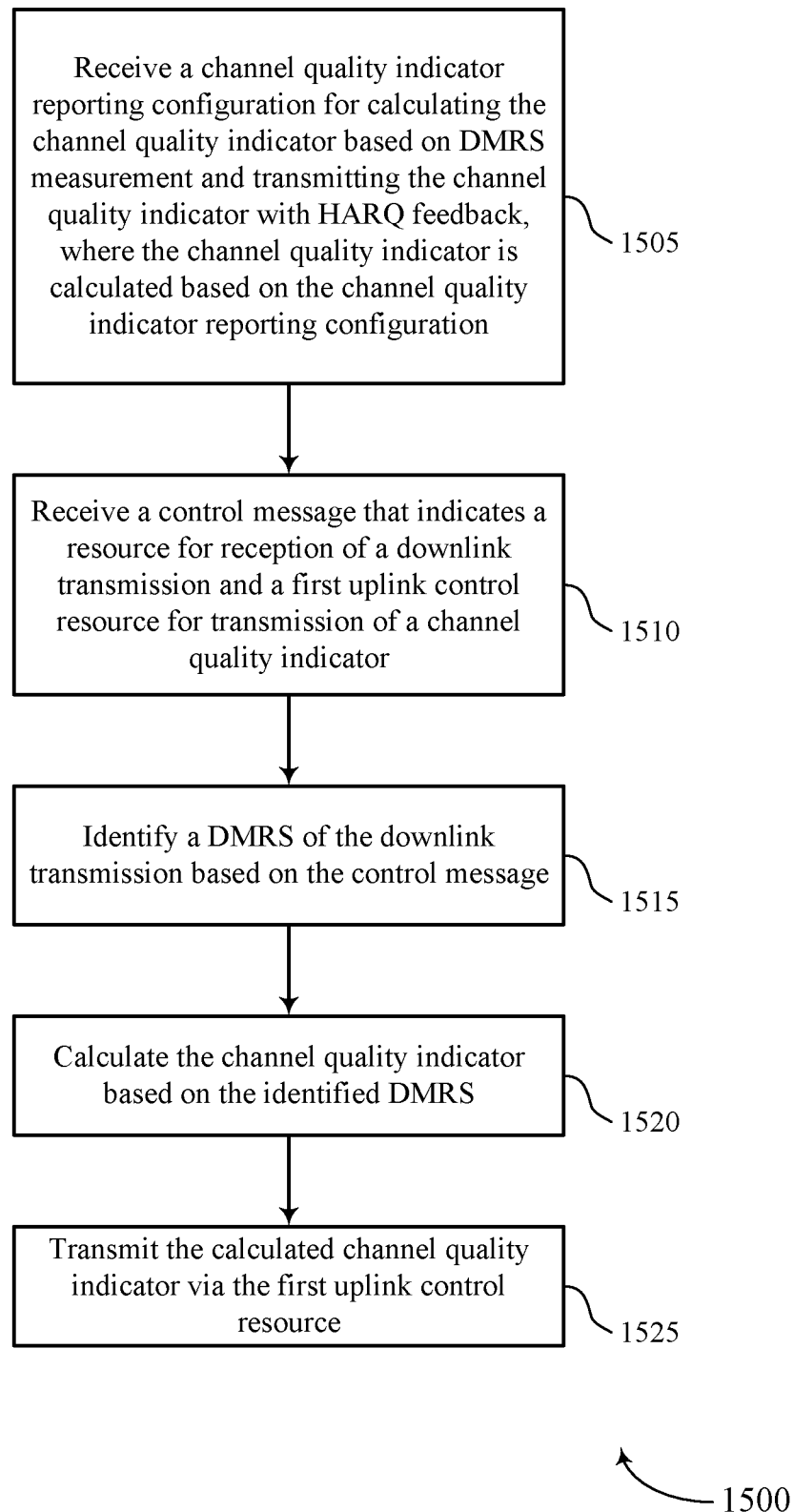

FIG. 15 shows a flowchart illustrating a method 1500 that supports CQI reporting based on DMRS in accordance with aspects of the present disclosure. The operations of method 1500 may be implemented by a UE 115 or its components as described herein. For example, the operations of method 1500 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1505, the UE may receive a CQI reporting configuration for calculating the CQI based on DMRS measurement and transmitting the CQI with HARQ feedback, where the CQI is calculated based on the CQI reporting configuration. The operations of 1505 may be performed according to the methods described herein. In some examples, aspects of the operations of 1505 may be performed by a CQI configuration manager as described with reference to FIGS. 4 through 7.

At 1510, the UE may receive a control message that indicates a resource for reception of a downlink transmission and a first uplink control resource for transmission of a CQI. The operations of 1510 may be performed according to the methods described herein. In some examples, aspects of the operations of 1510 may be performed by a control message manager as described with reference to FIGS. 4 through 7.

At 1515, the UE may identify a DMRS of the downlink transmission based on the control message. The operations of 1515 may be performed according to the methods described herein. In some examples, aspects of the operations of 1515 may be performed by a DMRS manager as described with reference to FIGS. 4 through 7.

At 1520, the UE may calculate the CQI based on the identified DMRS. The operations of 1520 may be performed according to the methods described herein. In some examples, aspects of the operations of 1520 may be performed by a CQI manager as described with reference to FIGS. 4 through 7.

At 1525, the UE may transmit the calculated CQI via the first uplink control resource. The operations of 1525 may be performed according to the methods described herein. In some examples, aspects of the operations of 1525 may be performed by a CQI manager as described with reference to FIGS. 4 through 7.

Figure 16:
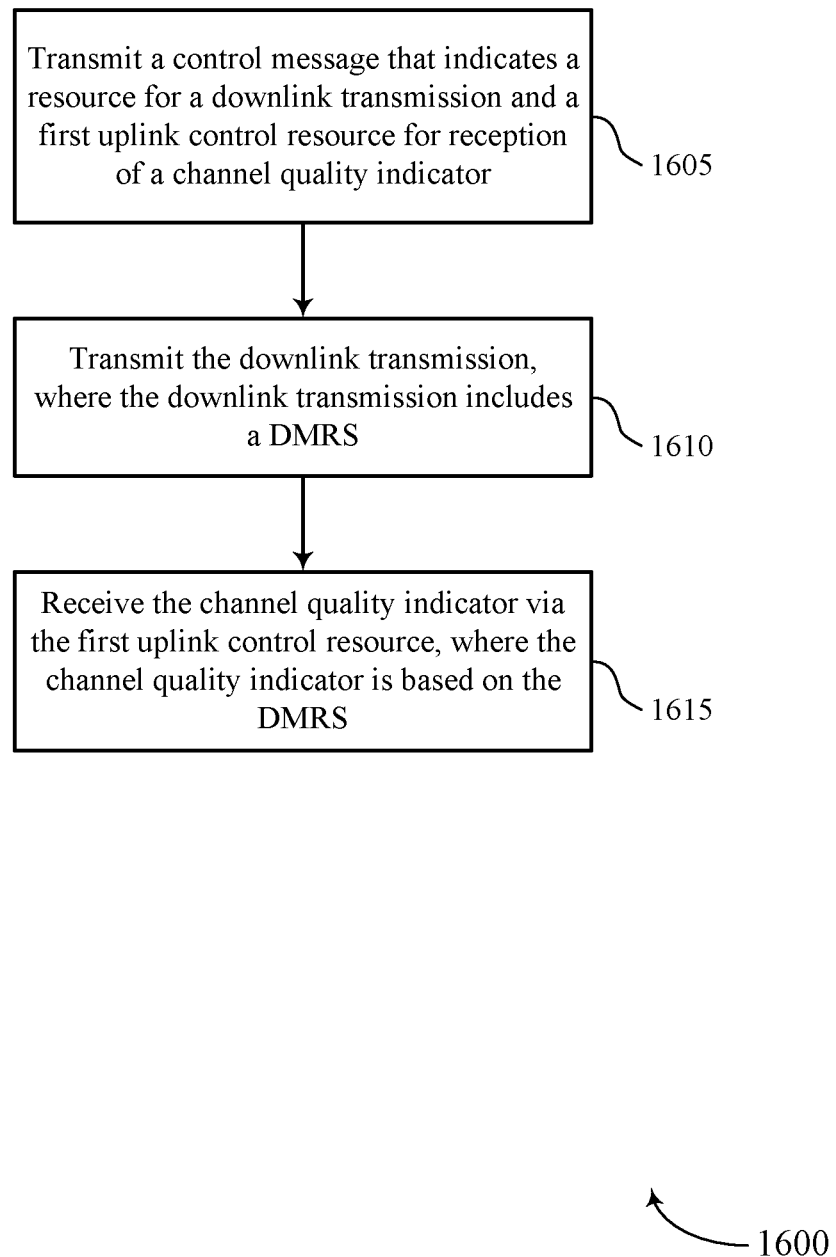

FIG. 16 shows a flowchart illustrating a method 1600 that supports CQI reporting based on DMRS in accordance with aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may transmit a control message that indicates a resource for a downlink transmission and a first uplink control resource for reception of a CQI. The operations of 1605 may be performed according to the methods described herein. In some examples, aspects of the operations of 1605 may be performed by a control message manager as described with reference to FIGS. 8 through 11.

At 1610, the base station may transmit the downlink transmission, where the downlink transmission includes a DMRS. The operations of 1610 may be performed according to the methods described herein. In some examples, aspects of the operations of 1610 may be performed by a PDSCH manager as described with reference to FIGS. 8 through 11.

At 1615, the base station may receive the CQI via the first uplink control resource, where the CQI is based on the DMRS. The operations of 1615 may be performed according to the methods described herein. In some examples, aspects of the operations of 1615 may be performed by a CQI manager as described with reference to FIGS. 8 through 11.

Figure 17:
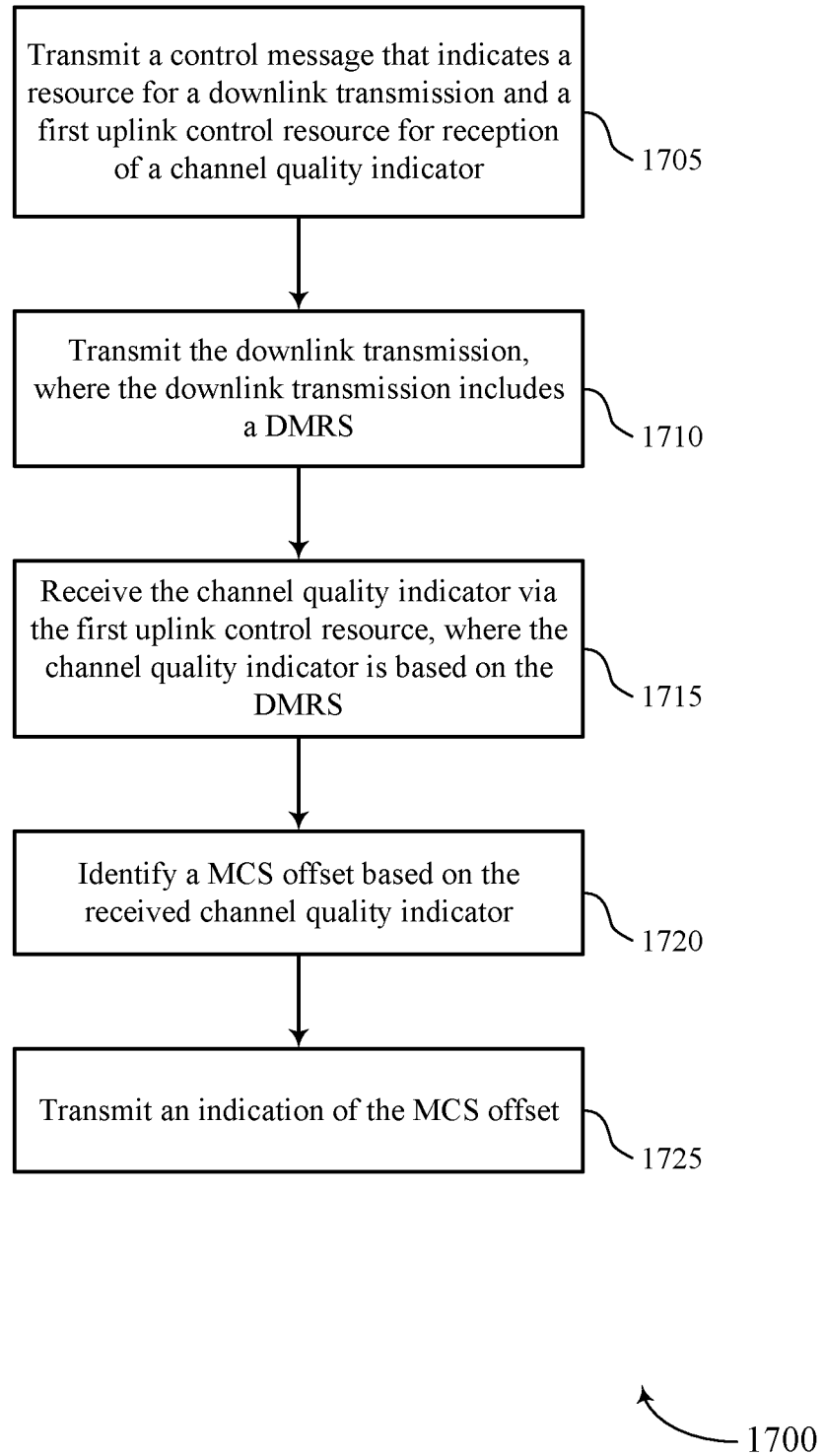

FIG. 17 shows a flowchart illustrating a method 1700 that supports CQI reporting based on DMRS in accordance with aspects of the present disclosure. The operations of method 1700 may be implemented by a base station 105 or its components as described herein. For example, the operations of method 1700 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1705, the base station may transmit a control message that indicates a resource for a downlink transmission and a first uplink control resource for reception of a CQI. The operations of 1705 may be performed according to the methods described herein. In some examples, aspects of the operations of 1705 may be performed by a control message manager as described with reference to FIGS. 8 through 11.

At 1710, the base station may transmit the downlink transmission, where the downlink transmission includes a DMRS. The operations of 1710 may be performed according to the methods described herein. In some examples, aspects of the operations of 1710 may be performed by a PDSCH manager as described with reference to FIGS. 8 through 11.

At 1715, the base station may receive the CQI via the first uplink control resource, where the CQI is based on the DMRS. The operations of 1715 may be performed according to the methods described herein. In some examples, aspects of the operations of 1715 may be performed by a CQI manager as described with reference to FIGS. 8 through 11.

At 1720, the base station may identify a MCS offset based on the received CQI. The operations of 1720 may be performed according to the methods described herein. In some examples, aspects of the operations of 1720 may be performed by a MCS manager as described with reference to FIGS. 8 through 11.

At 1725, the base station may transmit an indication of the MCS offset. The operations of 1725 may be performed according to the methods described herein. In some examples, aspects of the operations of 1725 may be performed by a MCS manager as described with reference to FIGS. 8 through 11.

Figure 18:
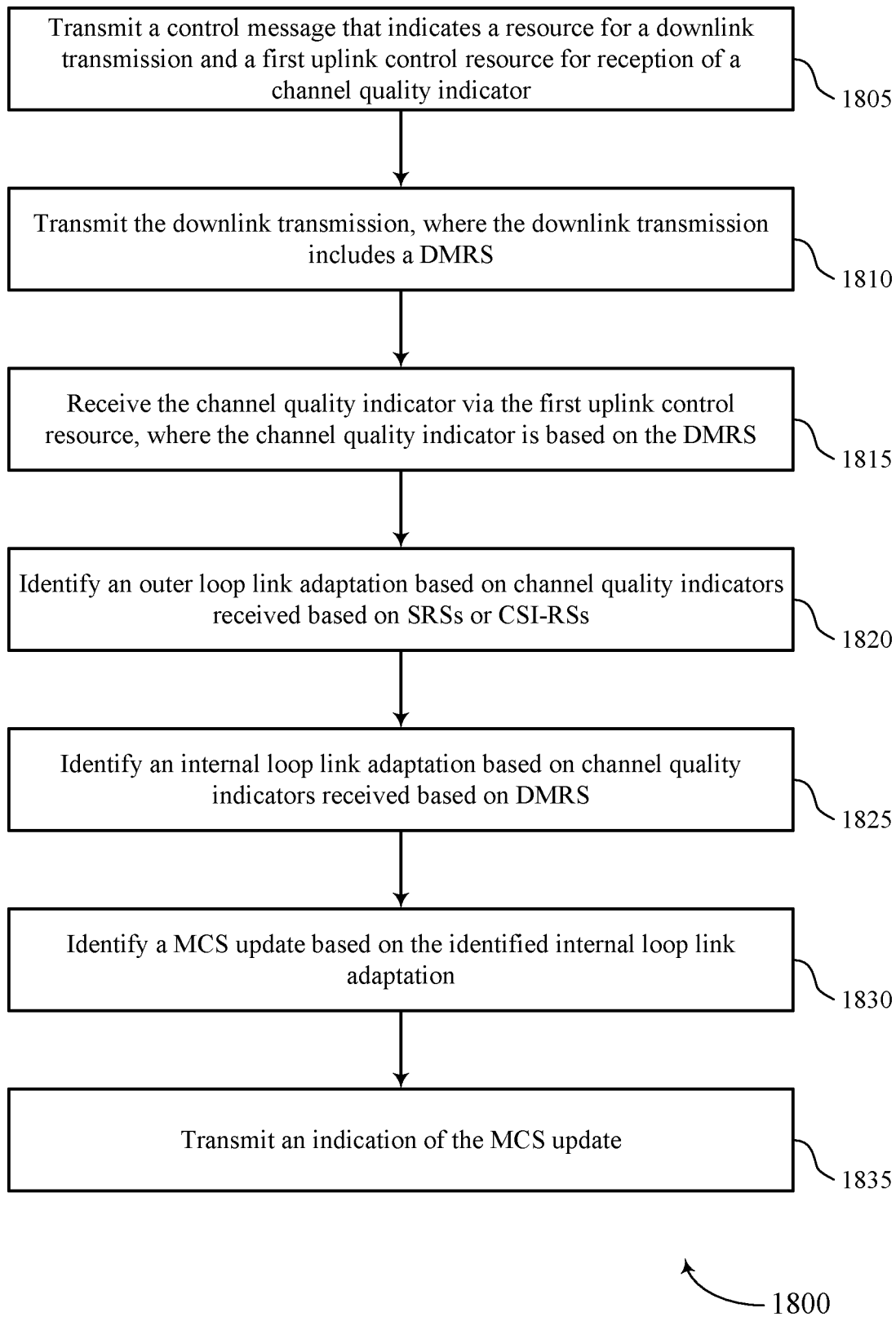

FIG. 18 shows a flowchart illustrating a method 1800 that supports CQI reporting based on DMRS in accordance with aspects of the present disclosure. The operations of method 1800 may be implemented by a base station 105 or its components as described herein. For example, the operations of method 1800 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1805, the base station may transmit a control message that indicates a resource for a downlink transmission and a first uplink control resource for reception of a CQI. The operations of 1805 may be performed according to the methods described herein. In some examples, aspects of the operations of 1805 may be performed by a control message manager as described with reference to FIGS. 8 through 11.

At 1810, the base station may transmit the downlink transmission, where the downlink transmission includes a DMRS. The operations of 1810 may be performed according to the methods described herein. In some examples, aspects of the operations of 1810 may be performed by a PDSCH manager as described with reference to FIGS. 8 through 11.

At 1815, the base station may receive the CQI via the first uplink control resource, where the CQI is based on the DMRS. The operations of 1815 may be performed according to the methods described herein. In some examples, aspects of the operations of 1815 may be performed by a CQI manager as described with reference to FIGS. 8 through 11.

At 1820, the base station may identify an outer loop link adaptation based on CQIs received based on SRSs or CSI-RSs. The operations of 1820 may be performed according to the methods described herein. In some examples, aspects of the operations of 1820 may be performed by a CQI manager as described with reference to FIGS. 8 through 11.

At 1825, the base station may identify an internal loop link adaptation based on CQIs received based on DMRS. The operations of 1825 may be performed according to the methods described herein. In some examples, aspects of the operations of 1825 may be performed by a CQI manager as described with reference to FIGS. 8 through 11.

At 1830, the base station may identify a MCS update based on the identified internal loop link adaptation. The operations of 1830 may be performed according to the methods described herein. In some examples, aspects of the operations of 1830 may be performed by a MCS manager as described with reference to FIGS. 8 through 11.

At 1835, the base station may transmit an indication of the MCS update. The operations of 1835 may be performed according to the methods described herein. In some examples, aspects of the operations of 1835 may be performed by a MCS manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a control message that indicates both a downlink resource for reception of a downlink transmission and a first uplink control resource for transmission of a channel quality indicator which is based at least in part on the downlink transmission;
   identifying a plurality of physical downlink shared channels (PDSCHs) associated with the downlink transmission;
   identifying a demodulation reference signal (DMRS) associated with a PDSCH selected from the plurality of PDSCHs based at least in part on the control message;
   calculating the channel quality indicator based at least in part on the identified DMRS associated with the selected PDSCH; and
   transmitting the calculated channel quality indicator via the first uplink control resource.

2. The method of claim 1, further comprising:
   multiplexing, on the first uplink control resource, the calculated channel quality indicator with an acknowledgement associated with the downlink transmission or a negative acknowledgement associated with the downlink transmission.

3. The method of claim 1, further comprising:
   receiving, with the control message, an indication of a second uplink control resource for transmission of a hybrid automatic repeat request (HARD) feedback, wherein the first uplink control resource and the second uplink control resource are different; and
   transmitting an acknowledgement associated with the downlink transmission or a negative acknowledgement associated with the downlink transmission via the second uplink control resource.

4. The method of claim 3, further comprising:
   receiving a timing offset; and
   identifying the first uplink control resource based at least in part on the timing offset and the second uplink control resource.

5. The method of claim 1, wherein the transmitted channel quality indicator indicates an acknowledgement of the downlink transmission.

6. The method of claim 1, further comprising:
   receiving a retransmission of the downlink transmission based at least in part on the transmitted channel quality indicator, wherein the transmitted channel quality indicator indicates a negative acknowledgement of the downlink transmission.

7. The method of claim 1, wherein transmitting the channel quality indicator further comprises:
   measuring a signal to noise ratio (SNR) of the identified DMRS; and
   transmitting a delta SNR, wherein the delta SNR is based at least in part on the measured SNR of the identified DMRS and a reference SNR, the reference SNR comprising an SNR of a configured modulation coding scheme (MCS), an SNR of a previous DMRS, or an SNR of a previous requested channel quality indicator.

8. The method of claim 1, wherein transmitting the channel quality indicator further comprises:
measuring a signal to noise ratio (SNR) of the identified DMRS; and
transmitting an absolute SNR, wherein the absolute SNR is based at least in part on the measured SNR of the identified DMRS.

9. The method of claim 1, wherein identifying the DMRS of the downlink transmission further comprises:
identifying a reference PDSCH associated with the downlink transmission based at least in part on the received control message, wherein the DMRS is identified based at least in part on the reference PDSCH.

10. The method of claim 1, wherein identifying the DMRS of the downlink transmission further comprises:
identifying a most recent DMRS.

11. The method of claim 1, further comprising:
transmitting an indication of the selected PDSCH and the calculated channel quality indicator based at least in part on the first uplink control resource.

12. The method of claim 1, further comprising:
identifying the plurality of PDSCHs associated with the downlink transmission within a window of the first uplink control resource;
calculating a plurality of channel quality indicators, each channel quality indicator based at least in part on a DMRS associated with each PDSCH of the plurality of PDSCHs;
identifying an average channel quality indicator based at least in part on the plurality of calculated channel quality indicators; and
transmitting the average channel quality indicator based at least in part on the first uplink control resource.

13. The method of claim 1, further comprising:
calculating a plurality of channel quality indicators, each channel quality indicator based at least in part on a DMRS associated with each PDSCH of the plurality of PDSCHs;
identifying a maximum channel quality indicator variation based at least in part on the plurality of calculated channel quality indicators; and
transmitting the maximum channel quality indicator variation based at least in part on the first uplink control resource.

14. The method of claim 1, further comprising:
calculating a plurality of channel quality indicators, each channel quality indicator based at least in part on a DMRS associated with each PDSCH of the plurality of PDSCHs; and
transmitting each of the calculated plurality of channel quality indicators with a corresponding acknowledgement or a negative acknowledgement associated with each PDSCH, based at least in part on the first uplink control resource.

15. The method of claim 1, further comprising:
determining a negative acknowledgement to be sent based at least in part on the downlink transmission; and
transmitting the calculated channel quality indicator based at least in part on the determination, wherein the calculated channel quality indicator comprises the determined negative acknowledgement.

16. The method of claim 1, further comprising:
receiving a channel quality indicator reporting configuration for calculating the channel quality indicator based on DMRS measurement and transmitting the channel quality indicator with hybrid automatic repeat request (HARQ) feedback, wherein the channel quality indicator is calculated based at least in part on the channel quality indicator reporting configuration received via radio resource control (RRC) signaling.

17. The method of claim 16, wherein transmitting the channel quality indicator further comprises:
transmitting the channel quality indicator with HARQ feedback based at least in part on the channel quality indicator reporting configuration.

18. The method of claim 1, wherein identifying the DMRS further comprises:
identifying a channel quality indicator report indication comprising a downlink control information (DCI) bit based at least in part on the control message, wherein the channel quality indicator report indication is associated with a physical downlink shared channel (PDSCH) transmission; and
identifying the DMRS based at least in part on the PDSCH transmission.

19. A method for wireless communication at a network device, comprising:
transmitting a control message that indicates both a downlink resource for a downlink transmission and a first uplink control resource for reception of a channel quality indicator which is based at least in part on the downlink transmission, wherein the downlink transmission is associated with a plurality of physical downlink shared channels (PDSCHs);
transmitting the downlink transmission, wherein the downlink transmission comprises a demodulation reference signal (DMRS) associated with a PDSCH selected from the plurality of PDSCHs; and
receiving the channel quality indicator via the first uplink control resource, wherein the channel quality indicator is based at least in part on the DMRS associated with the selected PDSCH.

20. The method of claim 19, further comprising:
transmitting a channel quality indicator reporting configuration for channel quality indicator calculation based on DMRS measurement and channel quality indicator reporting with hybrid automatic repeat request (HARD) feedback, wherein the channel quality indicator is received based at least in part on the channel quality indicator reporting configuration transmitted via radio resource control (RRC) signaling.

21. The method of claim 19, further comprising:
transmitting a channel quality indicator report indication, wherein the channel quality indicator report indication is associated with the PDSCH of the plurality of PDSCHs, the channel quality indicator report indication comprising a downlink control information (DCI) bit in the transmitted control message; and
receiving the channel quality indicator based at least in part on the channel quality indicator report indication, wherein the channel quality indicator corresponds to the PDSCH transmission.

22. The method of claim 19, further comprising:
transmitting, with the control message, an indication of a second uplink control resource for transmission of a hybrid automatic repeat request (HARD) feedback; and receiving an acknowledgement associated with the downlink transmission or a negative acknowledgement associated with the downlink transmission via the second uplink control resource.

23. The method of claim 22, further comprising:
identifying a timing offset between the first uplink control resource and the second uplink control resource; and
transmitting the timing offset, wherein the acknowledgement or the negative acknowledgement associated with the downlink transmission is received via the second uplink control resource indicated by the timing offset.

24. The method of claim 19, wherein the received channel quality indicator indicates an acknowledgement of the downlink transmission.

25. The method of claim 19, further comprising:
transmitting a retransmission of the downlink transmission based at least in part on the received channel quality indicator, wherein the received channel quality indicator indicates a negative acknowledgement of the downlink transmission.

26. The method of claim 19, wherein:
receiving the channel quality indicator comprises receiving an absolute signal to noise ratio (SNR) associated with the DMRS or a delta SNR associated with the DMRS and a reference SNR, wherein the reference SNR comprises an SNR of a configured modulation coding scheme (MCS), an SNR of a previous DMRS, or an SNR of a previous requested channel quality indicator.

27. The method of claim 19, further comprising:
identifying a modulation coding scheme (MCS) offset based at least in part on the received channel quality indicator; and
transmitting an indication of the MCS offset.

28. The method of claim 19, further comprising:
identifying an outer loop link adaptation based at least in part on channel quality indicators received based at least in part on sounding reference signals (SRSs) or channel state information reference signals (CSI-RSs);
identifying an internal loop link adaptation based at least in part on channel quality indicators received based at least in part on DMRS;
identifying a modulation coding scheme (MCS) update based at least in part on the identified internal loop link adaptation; and
transmitting an indication of the MCS update.

29. An apparatus for wireless communication at a user equipment (UE), comprising:
a processor,
memory coupled with the processor; and
instructions stored in the memory and executable by the processor to cause the apparatus to:
receive a control message that indicates both a downlink resource for reception of a downlink transmission and a first uplink control resource for transmission of a channel quality indicator which is based at least in part on the downlink transmission;
identify a plurality of physical downlink shared channels (PDSCHs) associated with the downlink transmission;
identify a demodulation reference signal (DMRS) associated with a PDSCH selected from the plurality of PDSCHs based at least in part on the control message;
calculate the channel quality indicator based at least in part on the identified DMRS associated with the selected PDSCH; and
transmit the calculated channel quality indicator via the first uplink control resource.

30. An apparatus for wireless communication at a network device, comprising:
a processor,
memory coupled with the processor; and
instructions stored in the memory and executable by the processor to cause the apparatus to:
transmit a control message that indicates both a downlink resource for a downlink transmission and a first uplink control resource for reception of a channel quality indicator which is based at least in part on the downlink transmission, wherein the downlink transmission is associated with a plurality of physical downlink shared channels (PDSCHs);
transmit the downlink transmission, wherein the downlink transmission comprises a demodulation reference signal (DMRS) associated with a PDSCH selected from the plurality of PDSCHs; and
receive the channel quality indicator via the first uplink control resource, wherein the channel quality indicator is based at least in part on the DMRS associated with the selected PDSCH.

\* \* \* \* \*